(12) United States Patent
Petersen

(10) Patent No.: US 11,782,221 B2
(45) Date of Patent: Oct. 10, 2023

(54) SNAP-ON DUST CAP FOR FIBER OPTIC CONNECTOR

(71) Applicant: COMMSCOPE TECHNOLOGIES LLC, Hickory, NC (US)

(72) Inventor: Cyle D. Petersen, Hickory, NC (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 17/530,198

(22) Filed: Nov. 18, 2021

(65) Prior Publication Data

US 2022/0146759 A1 May 12, 2022

Related U.S. Application Data

(63) Continuation of application No. 16/471,513, filed as application No. PCT/US2017/067718 on Dec. 20, 2017, now Pat. No. 11,209,600.

(Continued)

(51) Int. Cl.
 *G02B 6/38* (2006.01)

(52) U.S. Cl.
 CPC ......... *G02B 6/3849* (2013.01); *G02B 6/3831* (2013.01); *G02B 6/3893* (2013.01); *G02B 6/3898* (2013.01)

(58) Field of Classification Search
 CPC ....... G02B 6/44; G02B 6/4454; G02B 6/4457
 See application file for complete search history.

(56) References Cited

U.S. PATENT DOCUMENTS

| | | |
|---|---|---|
| 6,227,717 B1 | 5/2001 | Ott et al. |
| 6,398,422 B1 | 6/2002 | Szilagyi et al. |
| 6,547,450 B2 | 4/2003 | Lampert |
| 7,245,813 B2 | 7/2007 | Brown et al. |
| 8,262,294 B2 | 9/2012 | Marcouiller et al. |

(Continued)

FOREIGN PATENT DOCUMENTS

| | | |
|---|---|---|
| EP | 3 306 367 A1 | 4/2018 |
| GB | 2 509 532 A | 7/2014 |
| WO | 2015/114480 A1 | 8/2015 |

OTHER PUBLICATIONS

International Search Report and Written Opinion of the International Searching Authority for International Patent Application No. PCT/US2017/067718 dated Apr. 16, 2018, 12 pages.

(Continued)

*Primary Examiner* — Tina M Wong
(74) *Attorney, Agent, or Firm* — Merchant & Gould P.C.

(57) ABSTRACT

A dust cap includes a cap body and a pair of opposing latches. The cap body is adapted to cover a connectorized end of a fiber optic connector and cable assembly when the connectorized end is inserted through an opening of an interior of the cap body. The cap body further includes an opposing pair of resilient walls. The pair of opposing latches each include latching features that extend outside of the interior of the cap body. The pair of opposing latches each further include a mounting portion mounted to a respective one of the opposing pair of resilient walls. The dust cap may further include a pulling interface. The pulling interface may be adapted to attach to a pulling member and may be positioned at a tapered nose of the cap body. The dust cap may thereby be a cable pulling cap and may pull a fiber optic connector and cable assembly through conduits and other narrow passages. A pair of opposing pulling halves may enclose the cable pulling cap or the dust cap without a pulling interface and at least a portion of the connectorized end of the fiber optic connector and cable assembly.

20 Claims, 30 Drawing Sheets

Related U.S. Application Data

(60) Provisional application No. 62/437,510, filed on Dec. 21, 2016.

(56) References Cited

U.S. PATENT DOCUMENTS

| | | |
|---|---|---|
| 8,374,478 B2 | 2/2013 | Marcouiller et al. |
| 8,620,129 B2 | 12/2013 | Rudenick et al. |
| 10,281,005 B2 | 5/2019 | Kowalczyk et al. |
| 2003/0123812 A1 | 7/2003 | Beatty et al. |
| 2005/0220434 A1 | 10/2005 | Hsieh |
| 2005/0232551 A1 | 10/2005 | Chang et al. |
| 2006/0285814 A1 | 12/2006 | Brown et al. |
| 2007/0217749 A1 | 9/2007 | Jong et al. |
| 2010/0310226 A1 | 12/2010 | Wakileh et al. |
| 2010/0316347 A1 | 12/2010 | Kowalczyk et al. |
| 2010/0322584 A1 | 12/2010 | Kowalczyk et al. |
| 2011/0013876 A1 | 1/2011 | Marcouiller et al. |
| 2011/0188813 A1 | 8/2011 | Marcouiller et al. |
| 2011/0194828 A1 | 8/2011 | Hackett |
| 2015/0277062 A1 | 10/2015 | Xiao et al. |
| 2016/0349474 A1 | 12/2016 | Kowalczyk et al. |
| 2017/0090126 A1 | 3/2017 | Lu |
| 2018/0095226 A1 | 4/2018 | Watanabe |
| 2018/0292613 A1 | 10/2018 | Cloud et al. |
| 2018/0335577 A1 | 11/2018 | Wong et al. |
| 2020/0174203 A1 | 6/2020 | De Jong et al. |

OTHER PUBLICATIONS

Extended European Search Report for corresponding European Patent Application No. 17882640.0 dated Jul. 21, 2020, 8 pages.

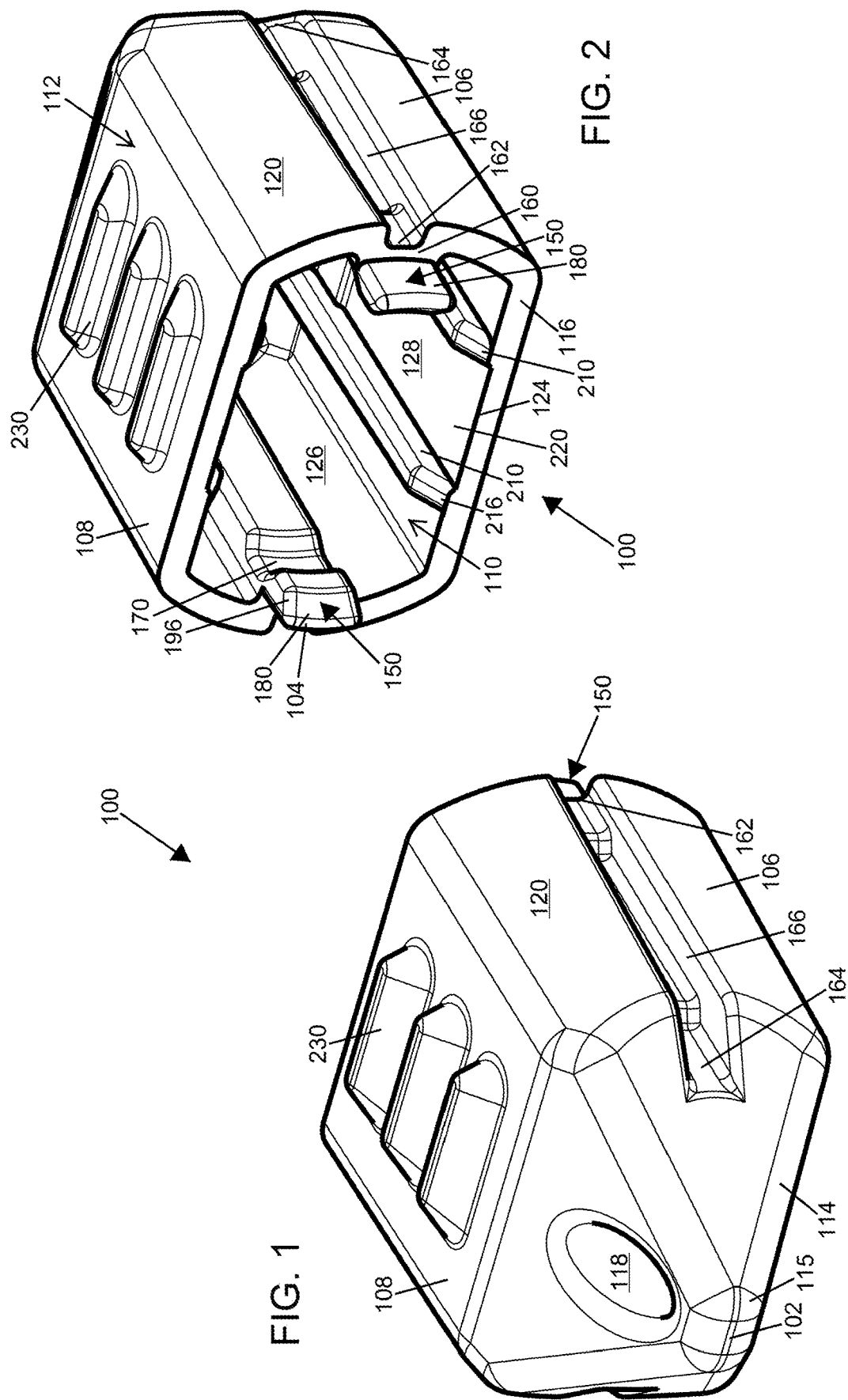

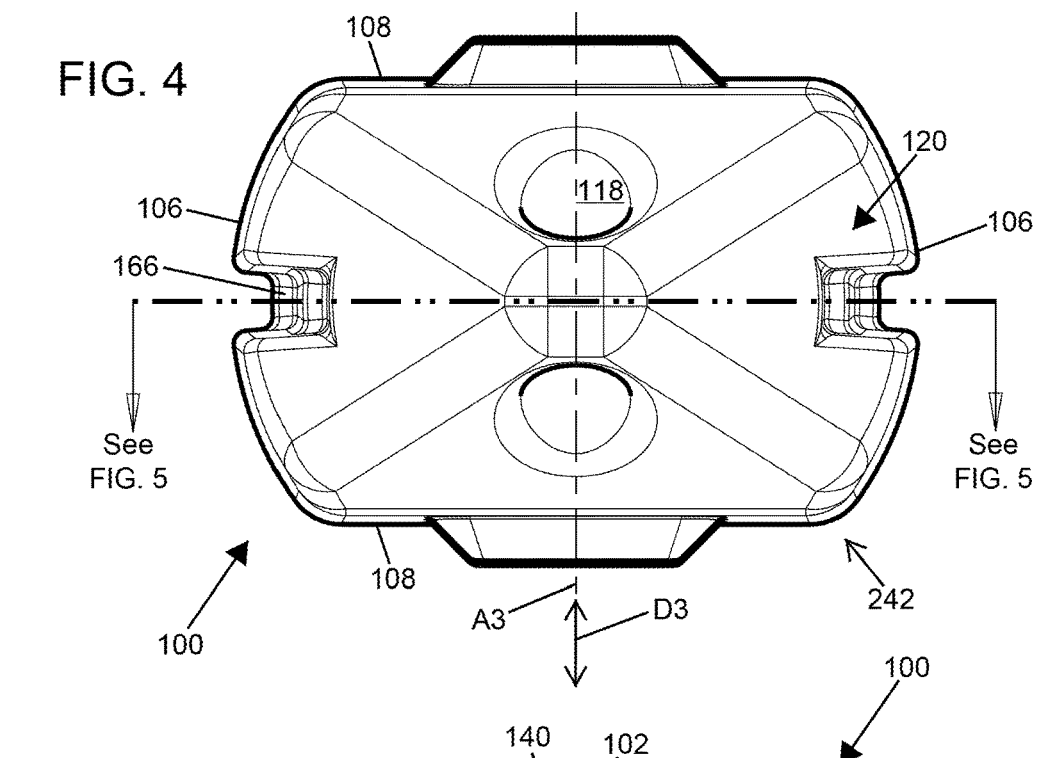
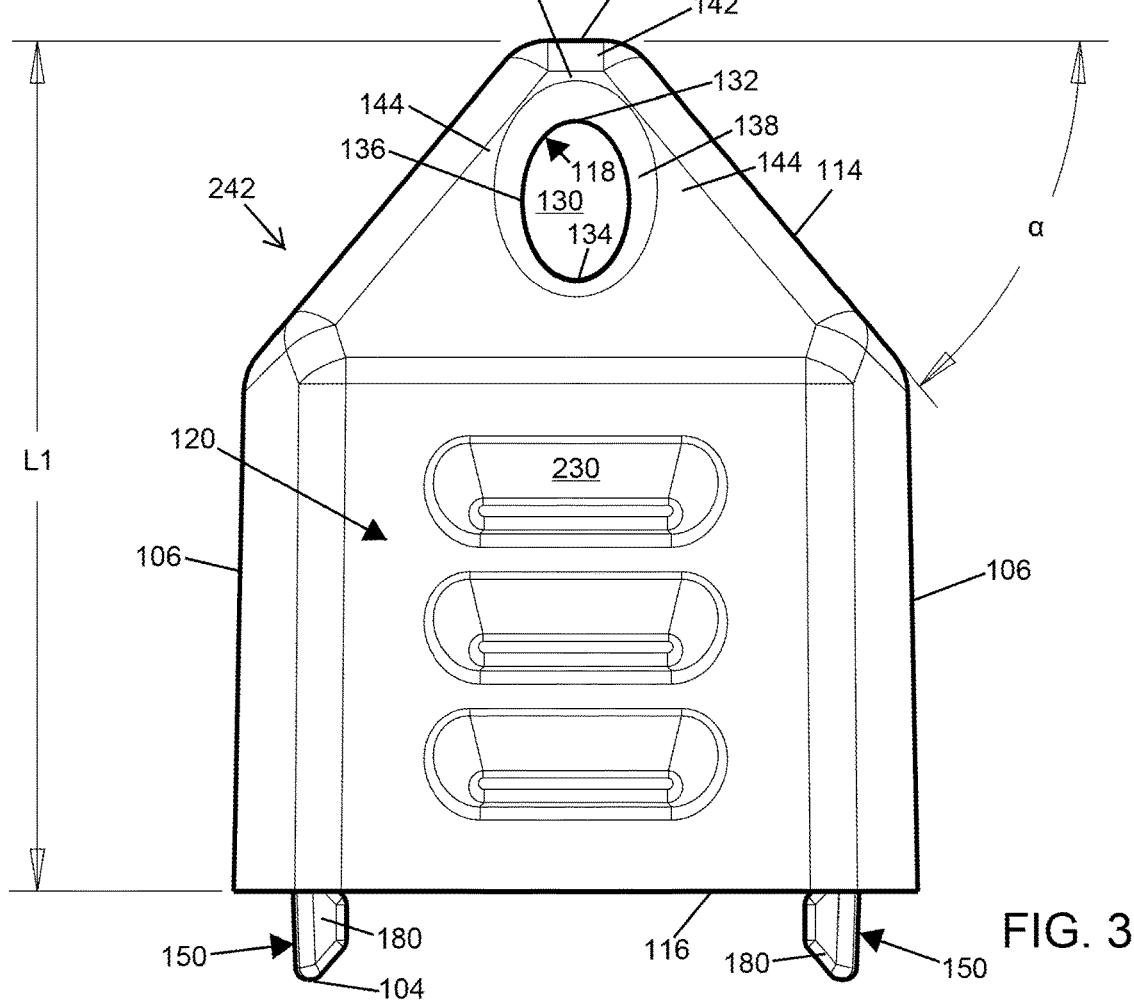

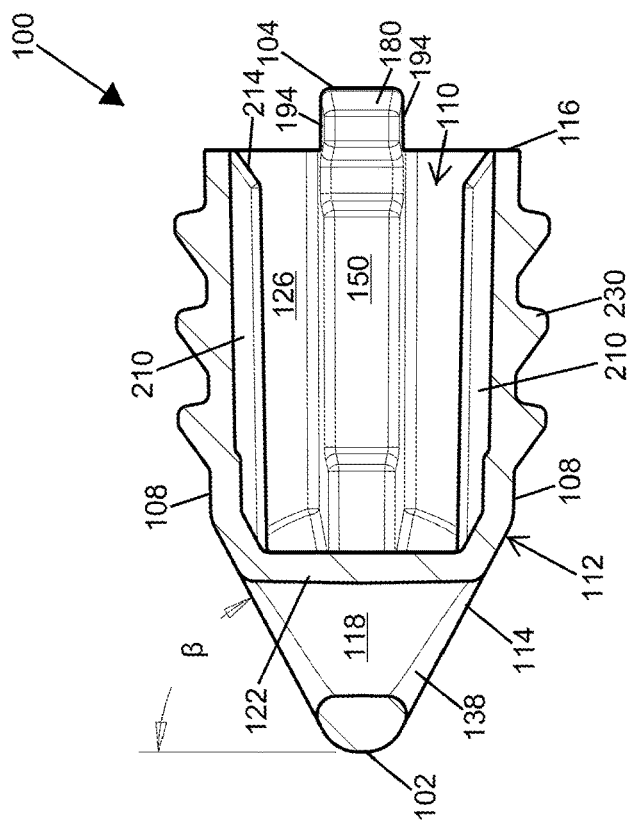

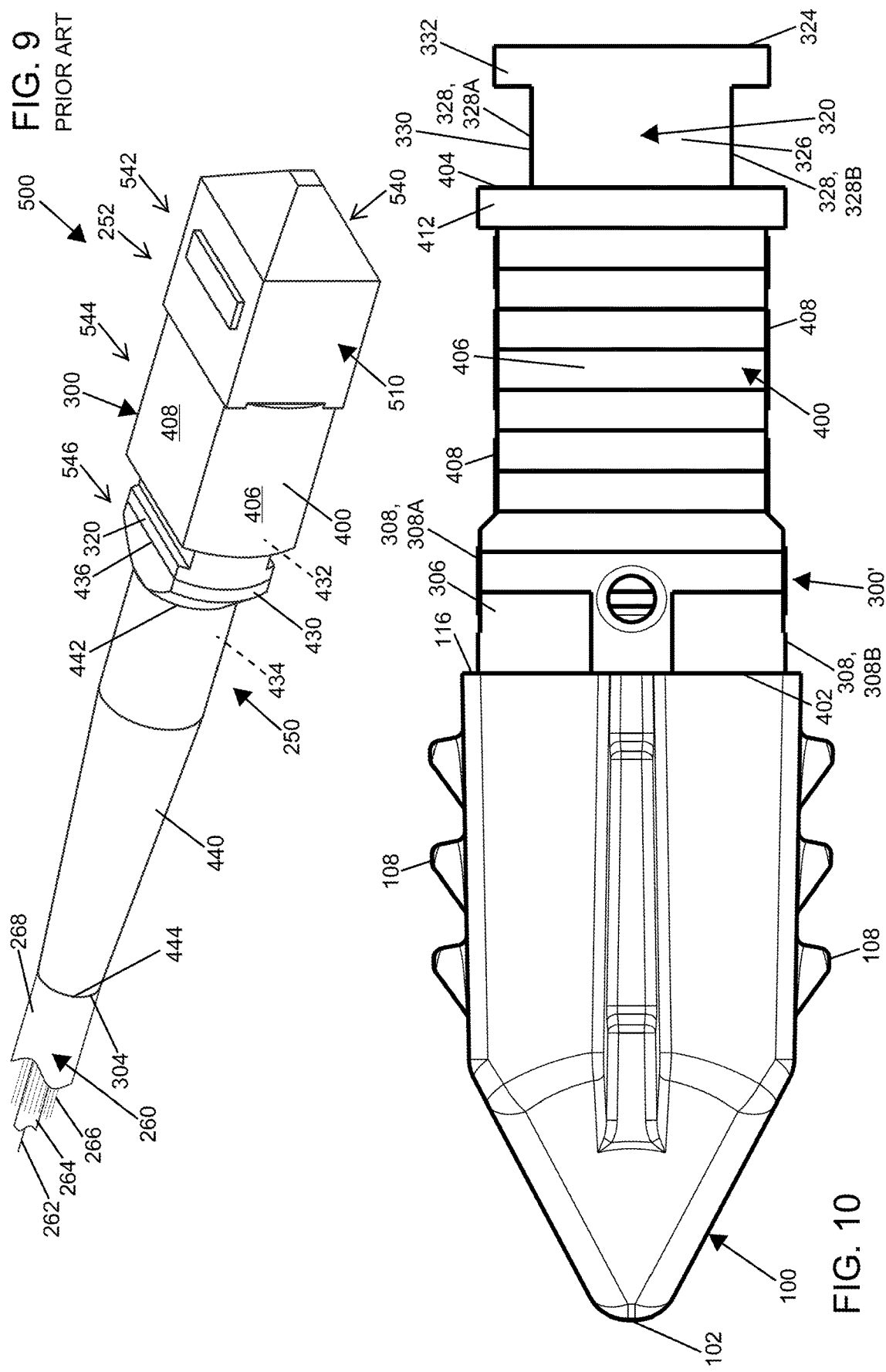

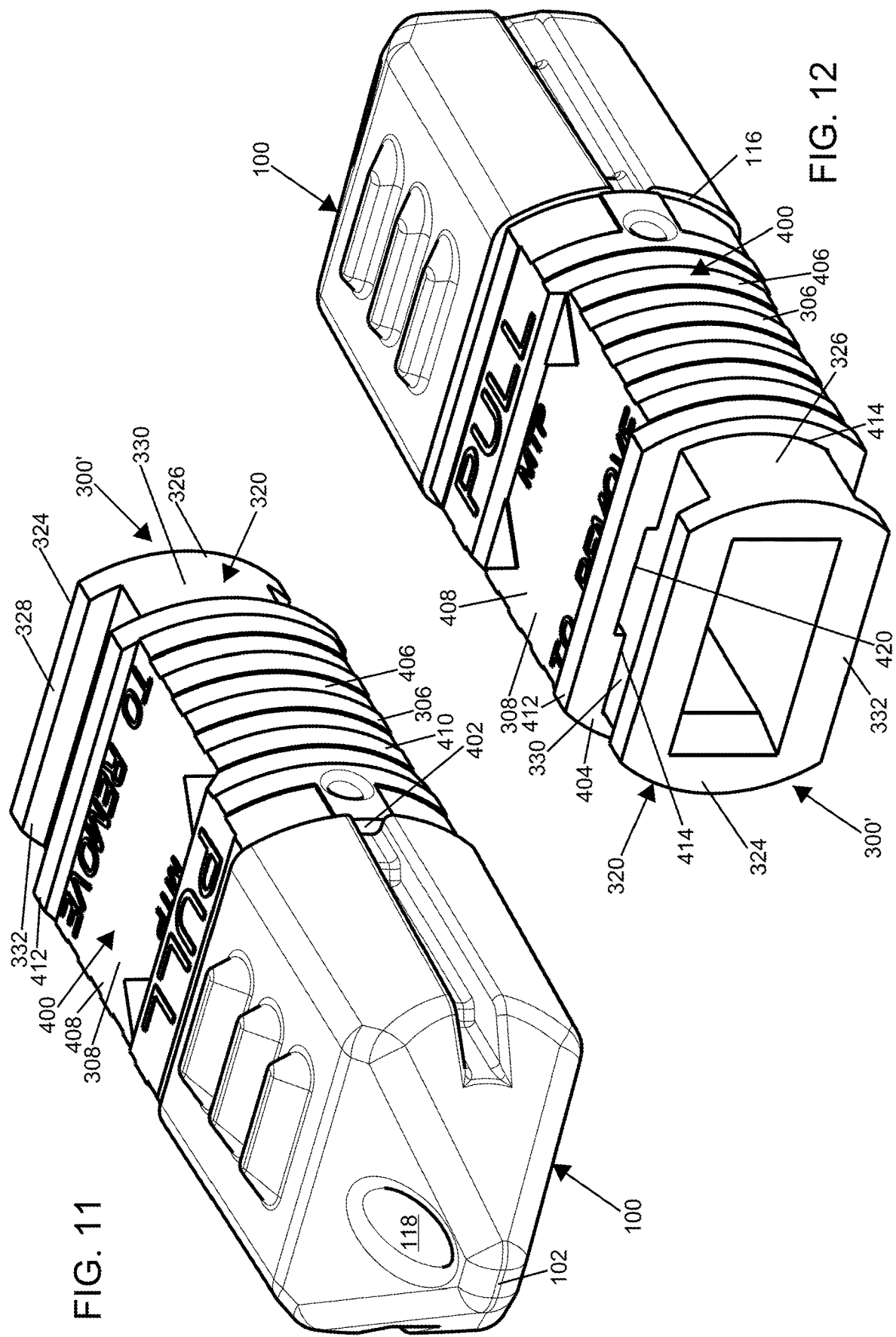

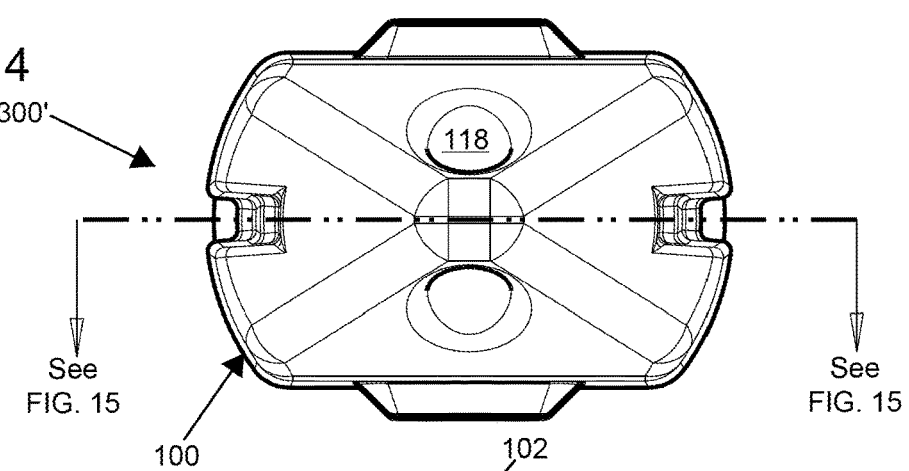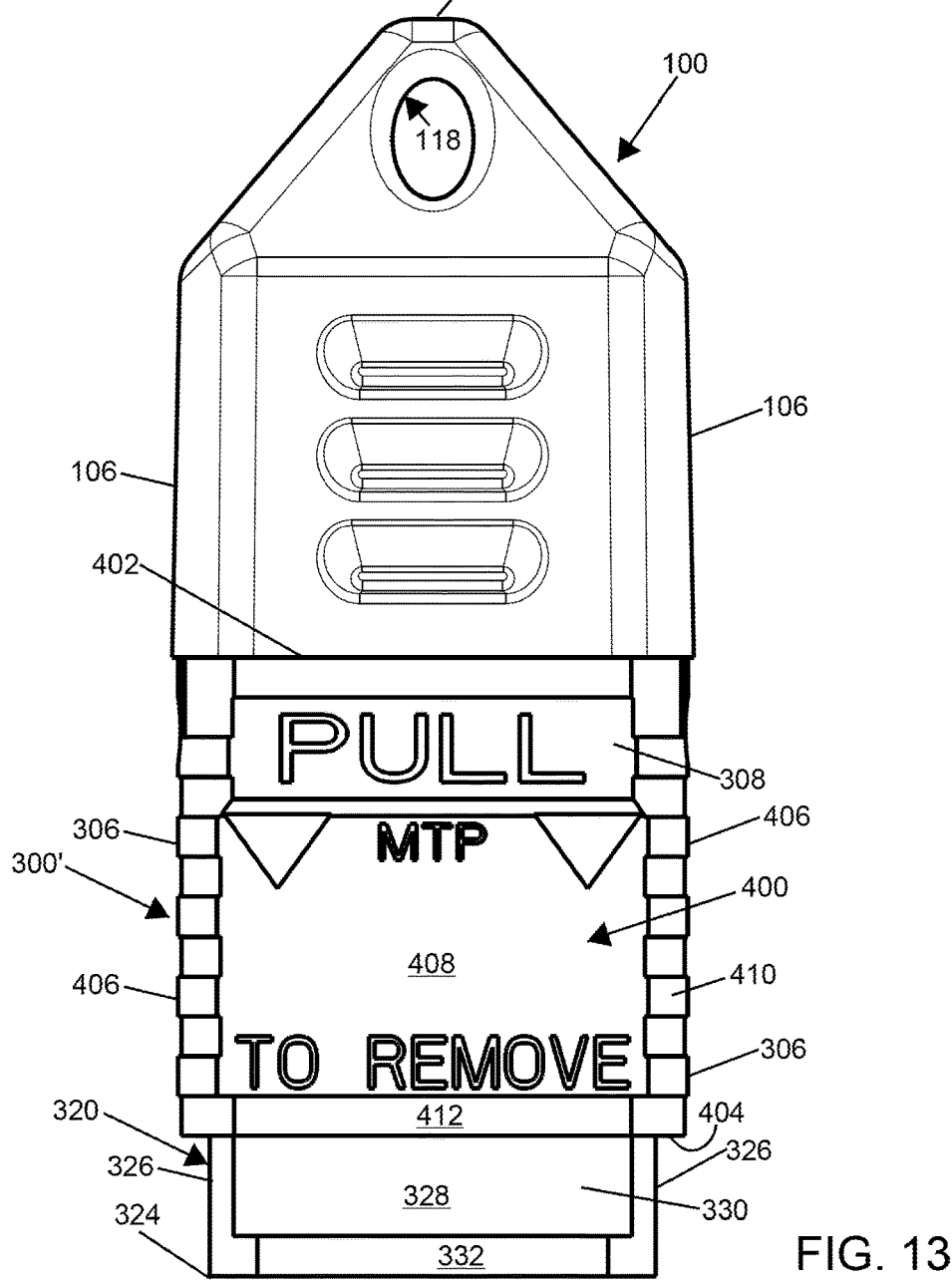

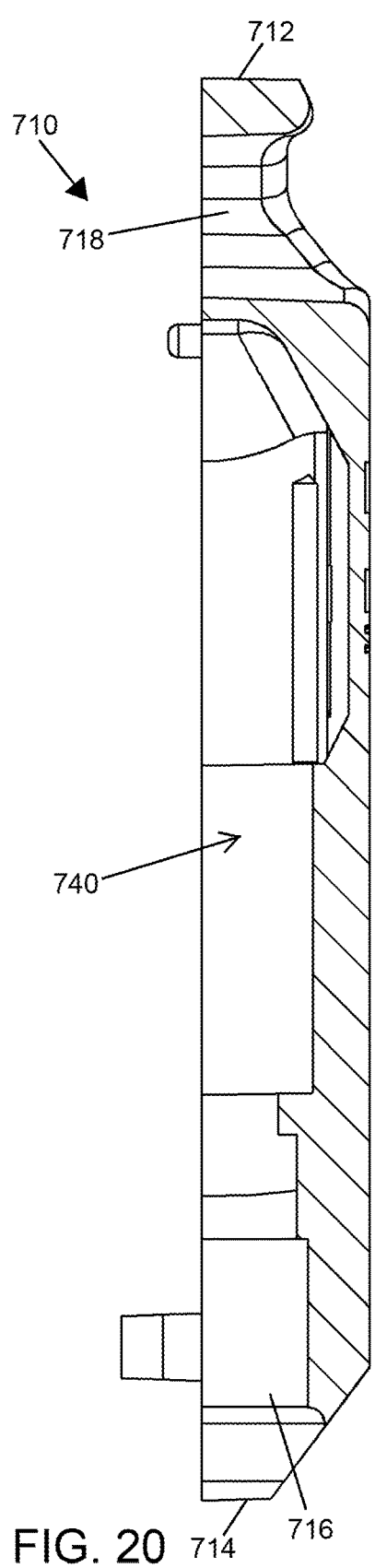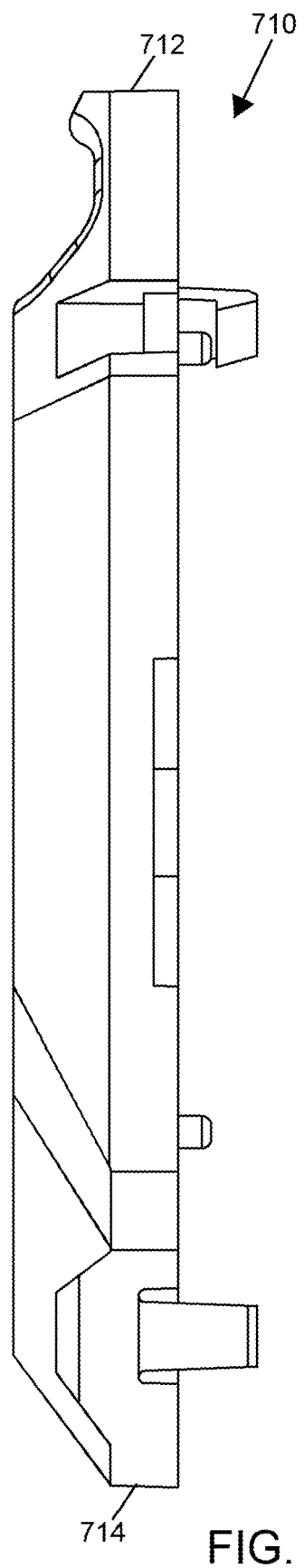
FIG. 20 PRIOR ART
FIG. 21 PRIOR ART

See FIG. 25

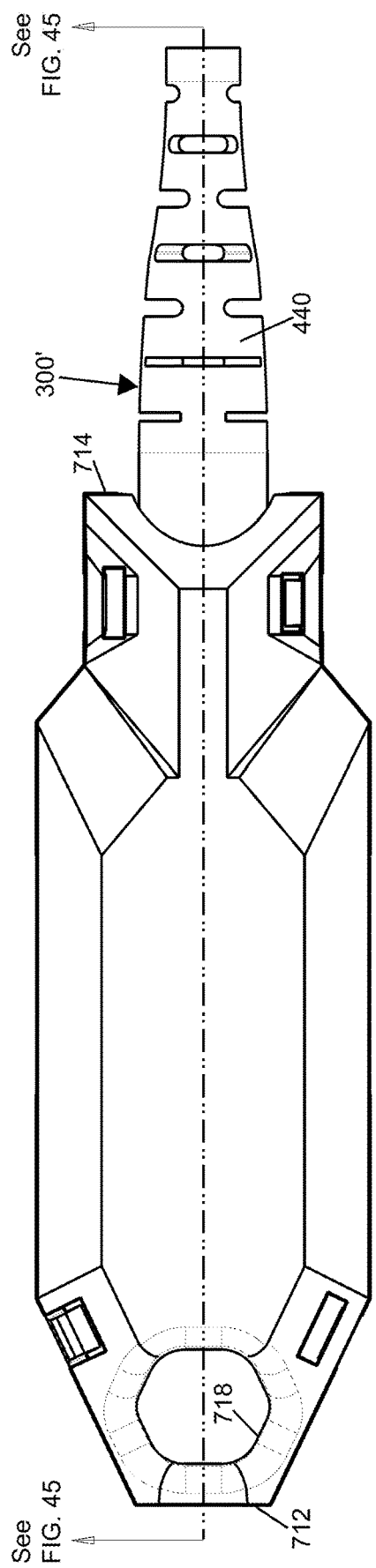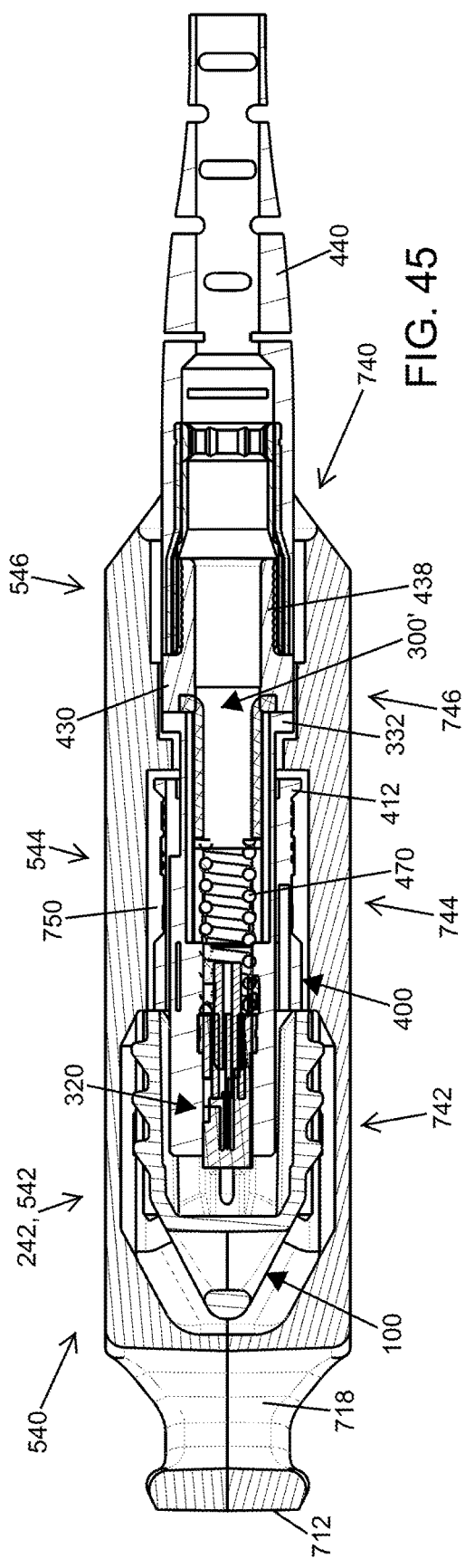

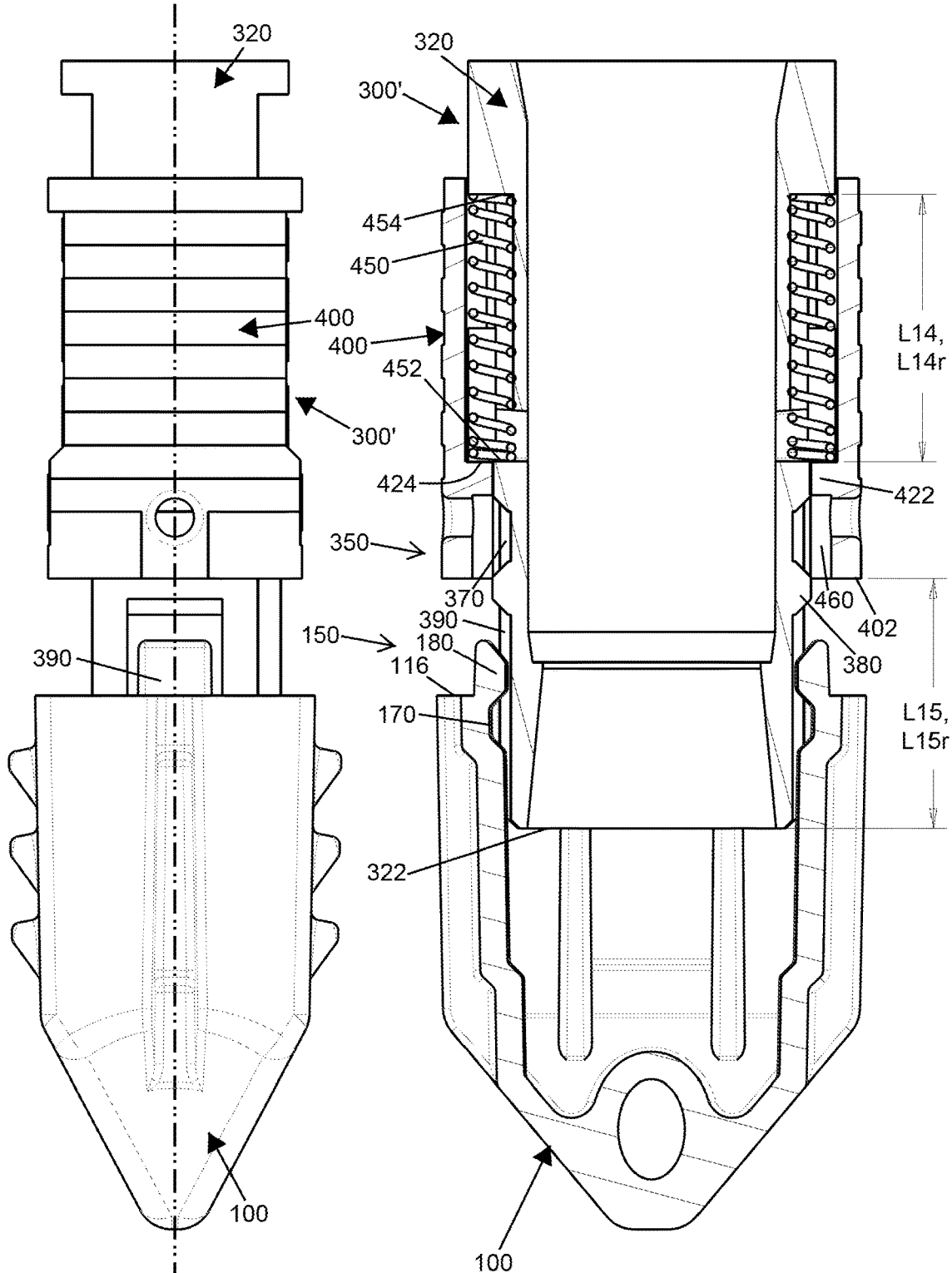

SNAP-ON DUST CAP FOR FIBER OPTIC CONNECTOR

CROSS-REFERENCE TO RELATED APPLICATION

This application is a continuation of U.S. patent application Ser. No. 16/471,513, filed on Jun. 19, 2019, now U.S. Pat. No. 11,209,600, which is a National Stage Application of PCT/US2017/067718, filed on Dec. 20, 2017, which claims the benefit of U.S. Patent Application Ser. No. 62/437,510, filed on Dec. 21, 2016, the disclosures of which are incorporated herein by reference in their entireties. To the extent appropriate, a claim of priority is made to each of the above disclosed applications.

TECHNICAL FIELD

The present disclosure relates to fiber optic data transmission and more particularly to fiber optic cables and fiber optic cable connection systems and the installation thereof.

BACKGROUND

As demand for telecommunications increases, optical fiber services are being extended in more and more areas. In order for a residence or business to access these optical fiber services, fiber optic cables must be installed in these residences and businesses. In some cases, the fiber optic cables are installed in existing structures. In other cases, these fiber optic cables are installed in new constructions.

To facilitate installation and connection to various telecommunications equipment, the fiber optic cables are often connectorized. In particular, one or both ends of the fiber optic cable may include a fiber optic connector. The fiber optic connector may connect to various telecommunications equipment, including other fiber optic cables. The fiber optic connector may support and position ends of optical fibers (e.g., within a ferule of the fiber optic connector). The ends of the optical fibers may abut ends of other optical fibers and thereby form an optical connection from fiber to fiber.

Prior to connection (e.g., during installation) and during periods of disconnection (e.g., during maintenance, reconfiguration, etc.), the ends of the optical fibers may be exposed. Exposure of the ends of the optical fibers is undesired as they may be subjected to contamination and/or damage. Caps (e.g., dust caps) may be fitted over the ends of the optical fibers by placing the caps over the end of the fiber optic connector. The ends of the optical fibers and/or the end of the fiber optic connector may thereby be protected from contamination and/or damage.

During installation and/or reconfiguration, the fiber optic cables may be routed through enclosed spaces, such as between support structures disposed inside walls. In order to get the fiber optic cables through these enclosed spaces, cable pullers can be used. The cable pullers may protect the ends of the optical fibers and/or the end of the fiber optic connector. However, cable pullers are not always preferred since the size of the cable pullers can prevent the cable from being pulled through small enclosed spaces. In certain installations, the fiber optic cables are pulled through conduits. A cross-dimension of the inside of the conduit may limit large cable pullers from being used to route the fiber optic cable through the conduit. In particular, certain cable pullers may be larger than the inside cross-dimension of the conduit and thereby be precluded from pulling fiber optic cables through the conduit.

SUMMARY

An aspect of the present disclosure relates to a cable assembly. The cable assembly includes a cap that is adapted for enclosing an end of a fiber optic cable. The cap includes a cavity that is adapted to receive a portion of the end of the fiber optic cable. The end of the fiber optic cable is connectorized and thereby includes a fiber optic connector at the end of the fiber optic cable. The cap includes a protective wall at a first end of the cap and latching structures at a second end of the cap. The latching structures are adapted to engage a catch of the fiber optic connector. A cross-sectional profile of the cap or at least a cross-dimension of the cap is at or close to a same size as a cross-sectional profile or at least a cross-dimension of the fiber optic connector. The cap thereby does not substantially limit the end of the fiber optic cable from fitting in tight spaces when the cap is applied. The cap includes flexible walls upon which the latch or latches are mounted. The flexible walls provide a resilient mount to the latches and thereby allow the latches to resiliently attach to catches of the fiber optic connector. Upon attachment of the latch or latches to the catch or catches of the fiber optic connector, a sleeve of the fiber optic connector may be slid over latch tabs of the latches thereby capturing the latch tabs in a pocket formed between the sleeve and a connector body of the fiber optic connector. The sleeve may include a face upon which a face of the cap seals against and thereby prevents an end of the fiber optic connector from being contaminated by dust. The protective wall at the first end of the cap may prevent damage to ends of the optical fibers and/or the end of the fiber optic connector by contact with foreign objects.

In certain embodiments, the cap includes a pulling interface (e.g., a pulling eye) at the first end of the cap and the latching structures at the second end of the cap. A pulling member (e.g., a cord, a tension member, etc.) may be looped through the pulling interface and thereby transfer a tensile load within the pulling member to the pulling interface. The cap may transfer the tensile load applied at the pulling interface to the latches, and the latches may further transfer the tensile load to the fiber optic connector and the fiber optic cable. The cross-sectional profile of the cap or at least the cross-dimension of the cap may be at or close to the same size as the cross-sectional profile or at least the cross-dimension of the fiber optic connector. The cap thereby does not substantially limit the fiber optic cable from being pulled through small conduits, openings, and/or small spaces, etc.

Another aspect of the present disclosure relates to a split pulling assembly, including two halves, that is adapted for positioning around a fiber optic connector and cable assembly with a pulling cap latched to an end of the fiber optic connector. The split pulling assembly includes a pulling eye or a pulling interface at a first end and a cable pulling interface at a second end. A pulling member may be installed through the pulling eye of the split pulling assembly and thereby apply a tensile load from within the pulling member to the split pulling assembly. The split pulling assembly may transfer the tensile load to the fiber optic connector and cable assembly at the pulling interface at the second end of the split pulling assembly. The split pulling assembly may transfer the tensile load of the pulling member to a cable anchor member installed at the second end of a connector body of the fiber optic connector. The split pulling assembly may thereby transfer the tensile load of the pulling member by bearing on the cable anchor of the fiber optic connector. As the split pulling assembly is positioned around the fiber optic connector and cable assembly and the pulling cap installed thereon, the pulling assembly has a cross-sectional profile or at least a cross-dimension that is larger than the fiber optic connector. The split pulling assembly may thereby be used to pull the fiber optic cable through a larger conduit with the pulling cap installed inside the split pulling assembly. Upon the conduit getting smaller or upon routing the fiber optic cable through a smaller conduit, the split pulling assembly may be removed and the same pulling member or another pulling member may be looped through a pulling eye of the pulling cap. The pulling cap may have a cross-sectional profile or at least a cross-dimension that is similar to or the same as a cross-sectional profile or at least a cross-dimension of the fiber optic connector. The pulling cap may thereby be used to complete or continue routing of the fiber optic cable through a smaller conduit. The smaller conduit may include a passage too small for the split pulling assembly to fit through.

The process of the preceding paragraph may be reversed. For example, the pulling cap may be secured to a pulling member and the fiber optic cable may be routed through a small conduit. Upon reaching a larger portion of the conduit or a larger conduit, the split pulling assembly may be installed over the fiber optic cable and connector with the pulling cap installed on an end thereof. The fiber optic cable may be further routed through the larger conduit by pulling on a pulling eye of the split pulling assembly.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

BRIEF DESCRIPTION OF THE DRAWINGS

FIG. 1 is a perspective view of a dust cap having exemplary features of aspects in accordance with the principles of the present disclosure;

FIG. 2 is another perspective view of the dust cap of FIG. 1;

FIG. 3 is a plan view of the dust cap of FIG. 1;

FIG. 4 is an end view of the dust cap of FIG. 1;

FIG. 7 is an opposite end view of the dust cap of FIG. 1;

FIG. 8 is a cut-away side view of the dust cap of FIG. 1;

FIG. 9 is a perspective view of a prior art dust cap installed on a prior art fiber optic connector and cable assembly;

FIG. 10 is a side view of the dust cap of FIG. 1 installed on portions of a prior art fiber optic connector of the prior art fiber optic connector and cable assembly of FIG. 9, in accordance with the principles of the present disclosure;

FIG. 11 is a perspective view of the dust cap of FIG. 1 installed on the portions of the fiber optic connector of FIG. 10;

FIG. 12 is another perspective view of the dust cap of FIG. 1 installed on the portions of the fiber optic connector of FIG. 10;

FIG. 13 is a plan view of the dust cap of FIG. 1 installed on the portions of the fiber optic connector of FIG. 10;

FIG. 14 is an end view of the dust cap of FIG. 1 installed on the portions of the fiber optic connector of FIG. 10;

FIG. 20 is a cross-sectional side view of the half of the prior art split pulling eye assembly of FIG. 19, as called out at FIG. 19;

FIG. 21 is an opposite side view of the half of the prior art split pulling eye assembly of FIG. 19;

Figure 33:
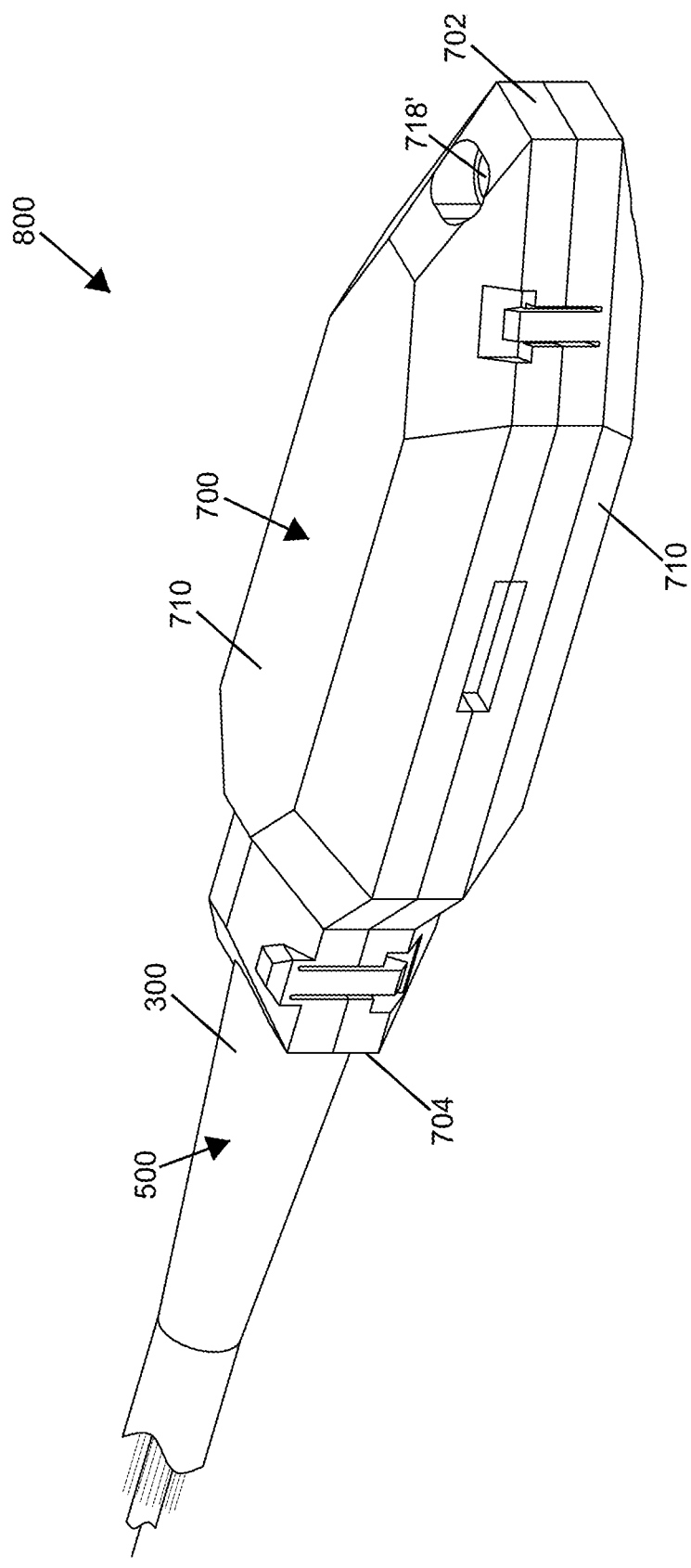
FIG. 33 is a perspective view of the prior art dust cap and the prior art fiber optic connector and cable assembly of FIG. 9 with a pair of the prior art split pulling eye assembly halves of FIG. 19 installed thereon.
Figures 38, 39:
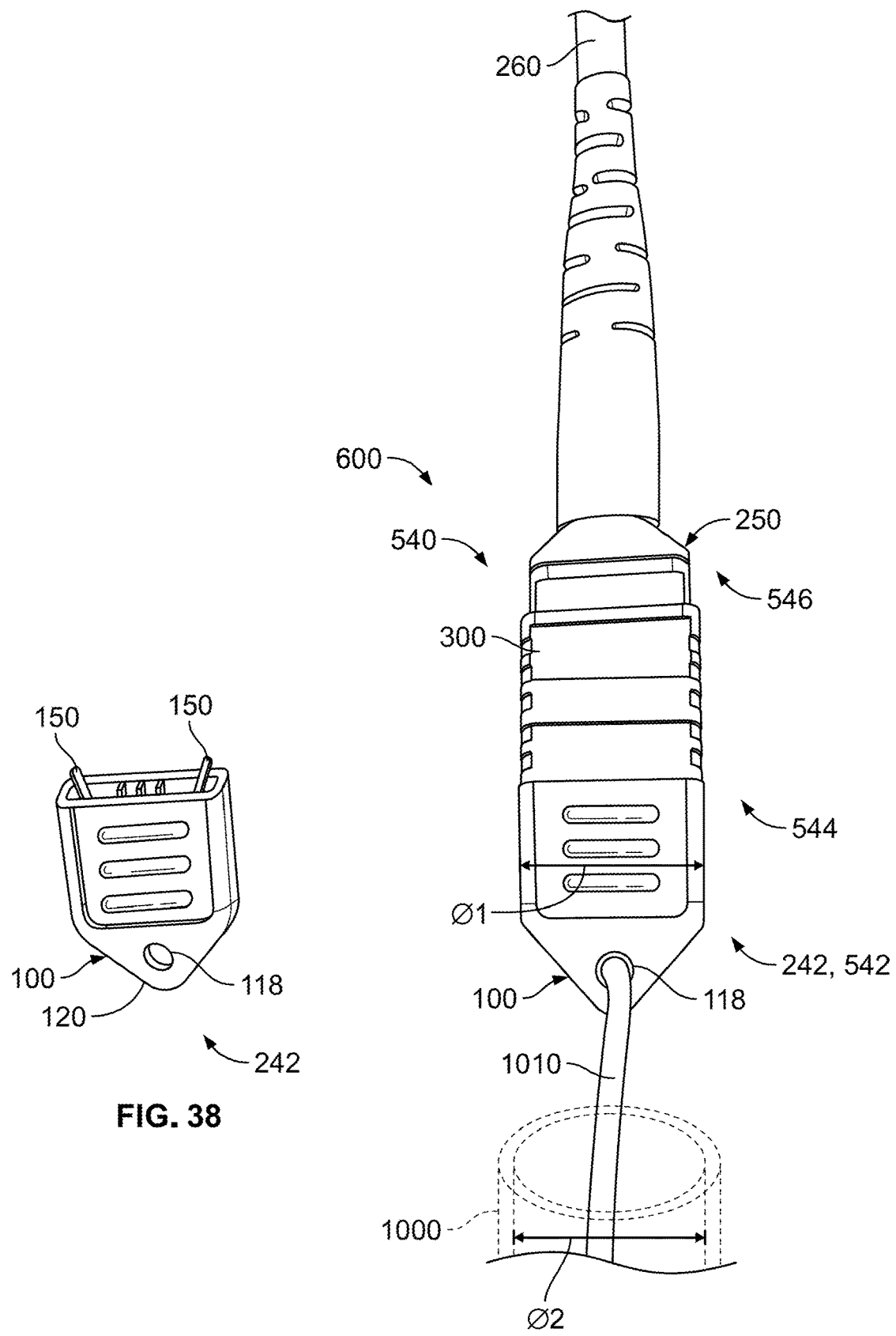
FIG. 38 is a perspective view of the dust cap of FIG. 1.
FIG. 39 is a perspective view of the dust cap of FIG. 1 installed on the prior art fiber optic connector and cable assembly of FIG. 9 with a pulling member looped through a pulling eye of the dust cap of FIG. 1 and with the pulling member routed through a conduit.
Figure 42:
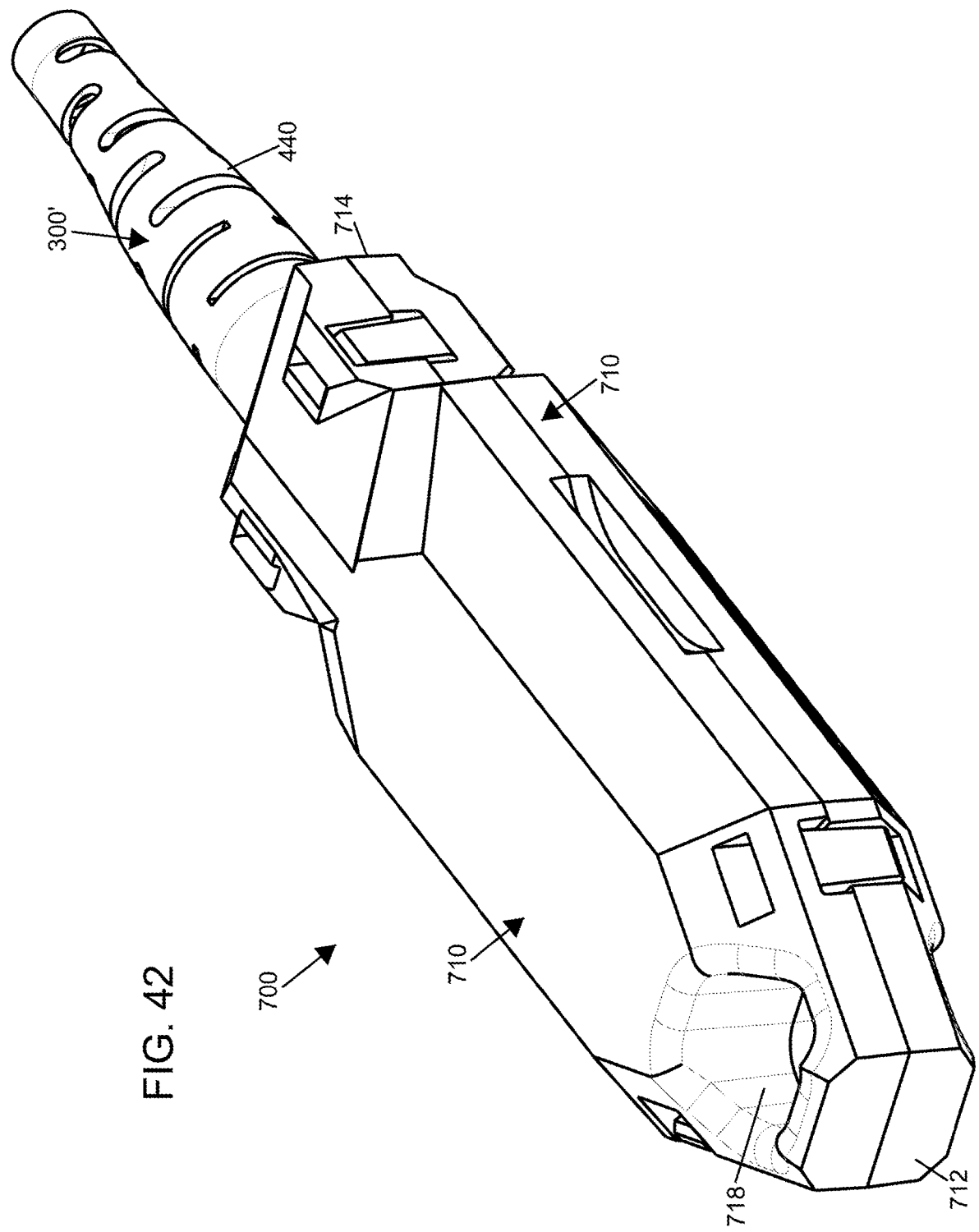
Figure 43:
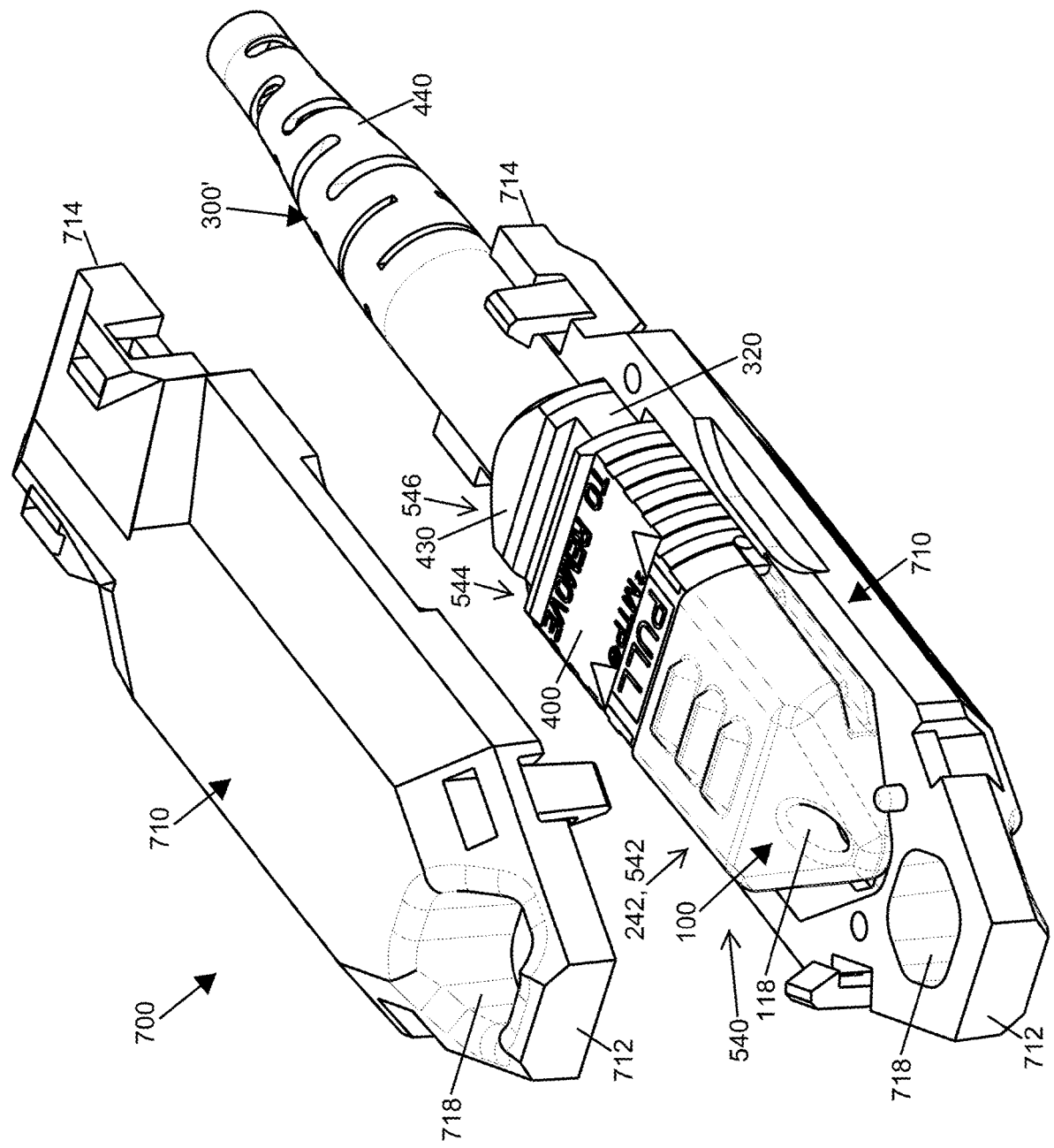
Figures 48, 49:
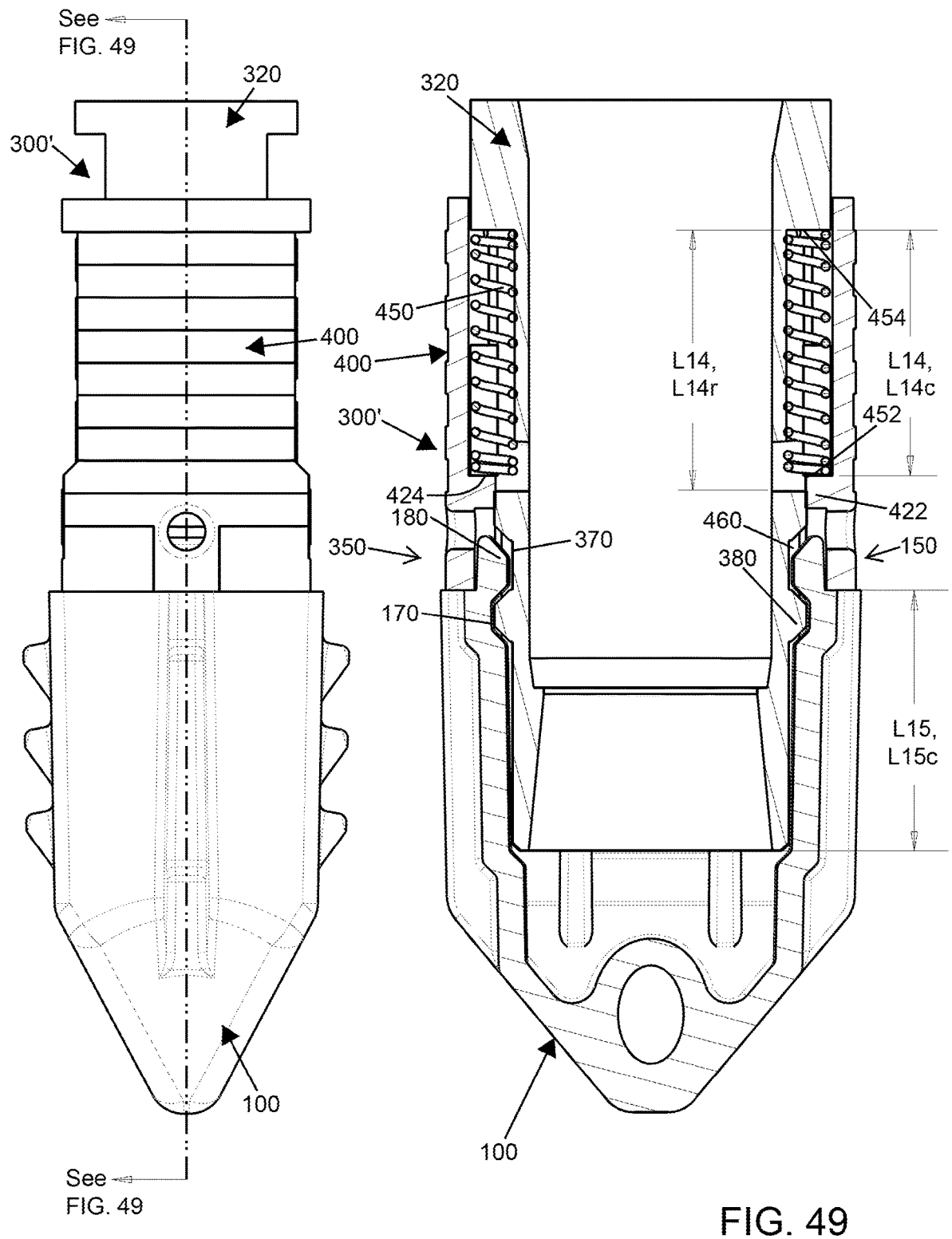

FIG. 42 is a perspective view of the dust cap and a portion of the prior art fiber optic connector and cable assembly of FIG. 39 installed in the prior art pair of the split pulling eye assembly halves of FIG. 33, according to the principles of the present disclosure;

FIG. 43 is the perspective view of FIG. 42, but exploded and reduced in scale;

FIG. 44 is a plan view of the dust cap and the portion of the prior art fiber optic connector and cable assembly of FIG. 42 installed in the prior art pair of the split pulling eye assembly halves of FIG. 33;

FIG. 45 is a cross-sectional elevation view of the dust cap and the portion of the prior art fiber optic connector and cable assembly of FIG. 42 installed in the prior art pair of the split pulling eye assembly halves of FIG. 33, as called out at FIG. 44;

FIG. 46 is a side view of the dust cap of FIG. 1 partially installed on portions of the prior art fiber optic connector of the prior art fiber optic connector and cable assembly of FIG. 9, in accordance with the principles of the present disclosure;

FIG. 47 is a cross-sectional plan view of the dust cap of FIG. 1 partially installed on the portions of the fiber optic connector of FIG. 46, as called out at FIG. 46;

FIG. 48 is a side view of the dust cap of FIG. 1 fully installed on the portions of the prior art fiber optic connector of FIG. 46, in accordance with the principles of the present disclosure; and FIG. 49 is a cross-sectional plan view of the dust cap of FIG. 1 fully installed on the portions of the fiber optic connector of FIG. 46, as called out at FIG. 48.

DETAILED DESCRIPTION

The present disclosure concerns dust caps and corresponding fiber optic connector and cable assemblies. The present disclosure further concerns cable pulling caps and corresponding fiber optic connector and cable assemblies. The same cap may serve as both a dust cap and a pulling cap. The dust cap/pulling cap can cover a distal end of the corresponding fiber optic connector and cable assembly.

Reference will now be made in detail to the exemplary aspects of the present disclosure that are illustrated in the accompanying drawings. Wherever possible, these same reference numbers will be used throughout the drawings to refer to the same or like structure.

Referring now to FIGS. 1-8, a dust cap 100, according to the principles of the present disclosure, is illustrated. As mentioned above, in certain embodiments, the dust cap 100 may further serve as a cable pulling cap. In certain embodiments, pulling features may be included on the dust cap 100 rendering the cable pulling cap with cable pulling functionality. The dust cap 100 may also be labeled a cable pulling dust cap, a snap-on pulling eye, a dust cap with pulling eye, a snap-on dust cap with pulling eye, an MPO connector dust cap, an MPO connector pulling cap, a cap, a pulling eye, etc.

Figure 5:
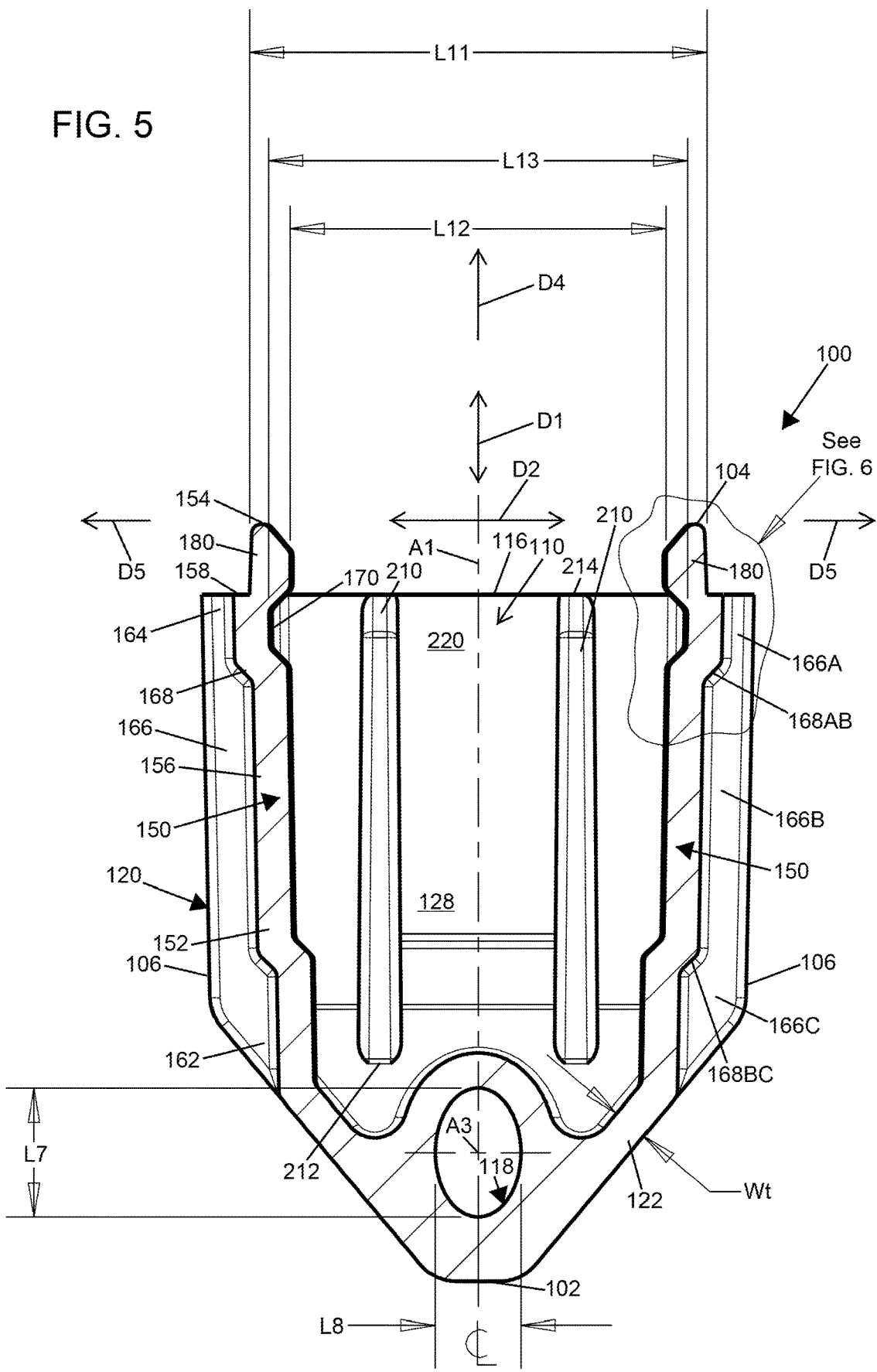
FIG. 5 is a cross-sectional plan view of the dust cap of FIG. 1, as called out at FIG. 4.

The dust cap 100 extends between a first end 102 and a second end 104. The first end 102 may be a front end, a distal end, etc. The dust cap 100 extends between opposite first and second sides 106. The dust cap 100 may further extend between opposite third and fourth sides 108. As illustrated at FIGS. 5 and 7, the dust cap 100 may define a longitudinal axis A1. As depicted, the dust cap 100 may include or may substantially include double symmetry about the longitudinal axis A1. The double symmetry about the axis A1 allows the dust cap 100 to be installed in two orientations positioned 180° rotated about the axis A1 from each other.

The opposite first and second sides 106 may be revolved about the longitudinal axis A1 or may have portions that are revolved about the longitudinal axis A1. The pair of opposite sides 106 may intersect with the pair of opposite sides 108 at four corners, respectively. The four corners may generally extend along a direction parallel to the longitudinal axis A1. However, in certain embodiments, the dust cap 100 includes a draft angle (e.g., 0.5°) for injection molding purposes and/or for other purposes that may angle the four corners of the dust cap 100 inwardly toward the longitudinal axis A1 as the four corners extend in a direction from the second end 104 to the first end 102.

An interior portion 110 of the dust cap 100 may be bounded by the pair of opposite sides 106 and the pair of opposite sides 108. A nose 114 may join the pair of opposite sides 106 and the pair of opposite sides 108 together at the first end 102 of the pulling cap 100. The nose 114 may further bound the interior portion 110 of the dust cap 100. The nose 114 may include a nose tip 115 at the first end 102 of the dust cap 100. As illustrated at FIG. 3, an angle α may define the nose 114 as it extends from the nose tip 115 to each of the opposite first and second sides 106. The angle α may be 50° or about 50° in the depicted embodiment. In other embodiments, the angle α may be 50°±5°. In still other embodiments, the angle α may have other values. As illustrated at FIG. 8, an angle β may define the nose 114 as the nose 114 extends from the nose tip 115 to the opposite third and fourth sides 108. The angle β may be 62° or about 62° in the depicted embodiment. In other embodiments, the angle β may be 62°±5°. In still other embodiments, the angle β may have other values.

A pulling interface 118 may be defined on the nose 114 of the dust cap 100. The pulling interface 118 may include a hole, a hook, a pulling eye, a through passage, etc. adapted to engage a pulling member 1010 (see FIG. 39). As depicted, the pulling member 1010 is a pulling cord looped around the pulling interface 118. In other embodiments, the pulling member 1010 may include other suitable structure to transmit a tensile load to the pulling interface 118. As depicted, the pulling interface 118 is defined by a hole extending along a transverse axis A3. As depicted, the transverse axis A3 is perpendicular to the axis A1. The transverse axis A3 is illustrated at FIGS. 3, 5, and 7. As illustrated at FIG. 5, the pulling interface 118 is an extruded elliptical shape with a dimension L7 extending along the longitudinal axis A1 and a dimension L8 extending perpendicular to the longitudinal axis A1 and perpendicular to the transverse axis A3. As depicted, the dimension L7 is greater than the dimension L8 by a factor of 150% or more. The dimension L7 may be 3 millimeters or about 3 millimeters in the depicted embodiment. In other embodiments, the dimension L7 may be 3±1 millimeters. In still other embodiments, the dimension L7 may have other values. As depicted at FIG. 7, a lateral axis A2 may be defined that is also perpendicular to the axis A1 and perpendicular to the axis A3. The lateral axis A2 is thereby parallel to the dimension L8. The dimension L8 may be 2 millimeters or about 2 millimeters in the depicted embodiment. In other embodiments, the dimension L8 may be 2±1 millimeters. In still other embodiments, the dimension L8 may have other values.

As illustrated at FIG. 8, the pulling interface 118 extends through the nose 114 of the dust cap 100. In particular, the pulling interface 118 extends through surfaces defined by the angular dimension β. The angles α and β are measured from a plane normal to the axis A1. As illustrated at FIG. 3, the pulling interface 118 defines a passage 130 that extends along the axis A3. The passage 130 extends between a first side 132 and a second side 134. The first side 132 may be a bearing side that engages the pulling member 1010, and the second side 134 may be a clearance side. The passage 130 may further extend between opposite third and fourth sides 136. As the passage 130 extends through the nose 114, radii 138 may be defined to transition the passage 130 to the surfaces defined by the angle β. The radii 138 may be a pair of opposing radii 138 on opposite ends of the passage 130. The nose 114 may define a bridge 140 that crosses the passage 130, as illustrated at FIG. 3. The bridge 140 may include a span 142 that includes the nose tip 115. The bridge 140 may further include opposite abutments 144 that join the span 142 to the opposite first and second sides 106. The geometry of the passage 130, including the radii 138, may engage the pulling member 1010 without sharp corners that may cut into and/or crease the pulling member 1010.

The dust cap 100 may include a cap body 120. The cap body 120 may include an end wall 122 that generally corresponds to the nose 114 of the dust cap 100. The cap body 120 may further include opposite first and second walls 126 that generally correspond to the opposite first and second sides 106. The opposite first and second walls 126 may be revolved about the longitudinal axis A1. The cap body 120 may further include opposite third and fourth walls 128 that generally correspond to the opposite third and fourth sides 108. As illustrated at FIG. 5, the end wall 122, the opposite walls 126, and the opposite walls 128 may be defined by a wall thickness Wt. The dimension Wt may be 0.82 millimeters or about 0.82 millimeters in the depicted embodiment. In other embodiments, the dimension Wt may be 0.82±0.4 millimeters. In still other embodiments, the dimension Wt may have other values. The wall thickness Wt may be substantially uniform among one or more of the walls 122, 126, 128. The walls 122, 126, 128 may mutually intersect and join each other and thereby form the interior portion 110 of the dust cap 100.

The opposite first and second walls 126 and the opposite third and fourth walls 128 may terminate at a face 116 adjacent the second end 104 of the dust cap 100. The face 116 may be a sealing face 116. The sealing face 116 may be suitable to keep dust out of the interior portion 110 (i.e., the cavity) of the dust cap 100. The sealing face 116 may not necessarily be water tight.

An opening 124 may be defined at the ends of the walls 126 and 128. The opening 124 may thereby be an opening through the sealing face 116. The interior portion 110 may be accessible through the opening 124. The walls 122, 126, 128 may each include a first side adjacent to the interior portion 110 of the dust cap 100 and may further each include a second side collectively adjacent to an exterior portion 112 of the dust cap 100.

A dimension L1 may extend from the face 116 to the nose tip 115 of the dust cap 100, as illustrated at FIG. 3. The dimension L1 may be 16 millimeters or about 16 millimeters in the depicted embodiment. In other embodiments, the dimension L1 may be 16±3 millimeters. In still other embodiments, the dimension L1 may have other values. As illustrated at FIG. 7, a dimension L9 is defined across the opposite third and fourth walls 128 at the exterior portion 112 of the dust cap 100. The dimension L9 may be 8.382 millimeters or about 8.382 millimeters in the depicted embodiment. In other embodiments, the dimension L9 may be 8.382±1.5 millimeters. In still other embodiments, the dimension L9 may have other values. As further defined at FIG. 7, a diameter dimension Ø1 may be defined across the opposite first and second walls 126. The diameter dimension Ø1 may be 13 millimeters or less in the depicted embodiment. In other embodiments, the diameter dimension Ø1 may be 13±2 millimeters. In still other embodiments, the diameter dimension Ø1 may have other values. As depicted, the diameter dimension Ø1 is defined at the exterior portion 112 of the dust cap 100. In the embodiment illustrated at FIG. 7, the diameter dimension Ø1 may define an encompassing diameter Ø1 of the dust cap 100. The encompassing diameter Ø1 may define a size of conduit that the dust cap 100 may pass through if an internal diameter Ø2 of the conduit 1000 (see FIG. 39) is equal to or larger than the encompassing diameter Ø1 of the dust cap 100.

As further illustrated at FIG. 7, pulling grips 230 may be defined on each of the opposite third and fourth walls 128 on the exterior portion 112 of the dust cap 100. The pulling grips 230 may extend beyond the dimension L9. In particular, the pair of pulling grips 230 extends a maximum dimension L10 from each other. The dimension L10 may be 9.955 millimeters or about 9.955 millimeters in the depicted embodiment. In other embodiments, the dimension L10 may be 9.955±1.5 millimeters. In still other embodiments, the dimension L10 may have other values. The encompassing diameter Ø1 may further encompass the pulling grips 230. The pair of pulling grips 230 does not necessarily limit the smallness of the conduit 1000 or other structure that the dust cap 100 may be pulled through.

As illustrated at FIG. 5, the dust cap 100 further includes a pair of opposing latches 150. The opposing latches 150 each extend between a first end 152 and a second end 154. The first end 152 is within the interior portion 110 of the dust cap 100, and the second end 154 extends beyond the face 116 and thereby extends beyond the interior portion 110 of the dust cap 100. As depicted, the second end 154 is a free end. As further depicted, each of the opposing latches 150 includes a flexibly mounted portion 156 that extends between the first end 152 and the face 116. The flexibly mounted portion 156 thereby extends between the first end 152 and an end 158 of the flexibly mounted portion. As illustrated at FIG. 5, the first end 152 is not intended to depict a precisely located end 152 of the opposing latches 150. Depending on the material used for the dust cap 100 and various geometry of the dust cap 100, the first end 152 of the opposing latches 150 may effectively vary along the length L1 from the nose 114 to other positions along the length L1 which give the opposing latches 150 suitable flexibility, as will be further described hereinafter.

The opposing latches 150 may flex along a lateral direction D2, as illustrated at FIG. 5. The second ends 154 of the opposing latches 150 may thereby resiliently flex away from each other when engaging the opposing latches 150 to corresponding catches, described hereinafter. To provide the opposing latches 150 with resilient flexibility, the opposing latches 150 may each be joined to, or formed within, the opposite first and second walls 126 between the first end 152 and the end 158. The opposing first and second walls 126 are made of a resilient material thereby accommodating resilient mounting of the opposing latches 150 at the flexibly mounted portion 156.

As illustrated at FIGS. 5 and 7, a direction D5 is defined parallel to the lateral direction D2 upon which the second ends 154 of the opposing latches 150 may move when spreading apart from each other to engage the corresponding catch. The opposing walls 126 are adapted to deform in the respective outward directions D5. Upon loads associated with the latching function being removed from the dust cap 100, the second ends 154 of the opposing latches 150 may return to their original positions.

In certain embodiments, the opposite first and second walls 126 may provide all or substantially all of the flexibility to allow the second end 154 of the opposing latches 150 to move in the directions D5. In other embodiments, the opposite third and fourth walls 128 may also be flexible and thereby contribute to the resilient mounting of the opposing latches 150. In particular, as illustrated at FIG. 7, by flexing the opposing latches 150 in the outward directions D5, the opposing first and second walls 126 may deform in the outward directions D5, and the opposite third and fourth walls 128 may deform in inward directions D6. The deformations of the opposing first and second walls 126 in the outward directions D5 may vary according to various positions on the opposite first and second walls 126. For example, portions of the opposite first and second walls 126 adjacent the face 116 may deform in the outward directions D5 at a greater magnitude than portions of the opposite first and second walls 126 adjacent the end wall 122. Likewise, deformation of the opposite third and fourth walls 128 in the directions D6 may vary at various positions of the opposite third and fourth walls 128. For example, portions of the opposite third and fourth walls 128 adjacent the face 116 may deform at a larger magnitude than portions of the opposite third and fourth walls 128 adjacent the end wall 122.

In certain embodiments, the end wall 122 may also deform in various ways and thereby contribute to the resilient mounting of the opposing latches 150. The above description of the walls 122, 126, 128 deforming are provided as examples. Other embodiments of the dust cap 100 may include other deformation directions upon which one or more of the walls 122, 126, 128 deform.

As illustrated at FIGS. 2 and 7, a C-structure 160 (e.g., a C-shape structure) may be defined along the flexibly mounted portion 156 of the opposing latches 150. The C-structure 160 extends between a first end 162 and a second end 164, as illustrated at FIGS. 1, 2, and 5. The C-structure 160 includes a channel 166 that extends between the first end 162 and the second end 164. As illustrated at FIG. 5, the channel 166 may include a first portion 166A, a second portion 166B, and a third portion 166C. The channel 166 may further include transitions 168. In particular, the channel 166 may include a transition 168AB between the first portion 166A and the second portion 166B. Likewise, the transitions 168 may include a transition 168BC between the second portion 166B of the channel 166 and the third portion 166C. The first portion 166A of the channel 166 may be adjacent the face 116. The third portion 166C of the channel 166 may be adjacent the nose 114 of the dust cap 100. The second portion 166B of the channel 166 may extend between the first portion 166A of the channel 166 and the third portion 166C of the channel 166.

As illustrated at FIGS. 2 and 7, the channel 166 defines an interior of the C-structure 160. The C-structure 160 thereby defines a pair of flanges separated and joined by a web. As illustrated at FIG. 7, the flanges of the C-structure 160 may join outer portions of the opposite first and second walls 126 substantially normal to the outer portions of the opposite first and second walls 126. The web of the C-structure 160, in turn, joins the flanges of the C-structure 160. The web of the C-structure 160 may be revolved about the longitudinal axis A1.

The C-structure 160 may provide the flexibly mounted portion 156 of the opposing latches 150 with an increased stiffness in comparison to remaining portions of the opposite first and second walls 126. As illustrated at FIG. 5, the C-structure 160 may also include the same or similar wall thickness Wt as other portions of the walls 122, 126, 128. By arranging the flexibly mounted portion 156 in the C-structure 160, the flexibility and internal load distribution of the opposing latches 150 to the opposing first and second walls 126 can be defined.

Figure 6:
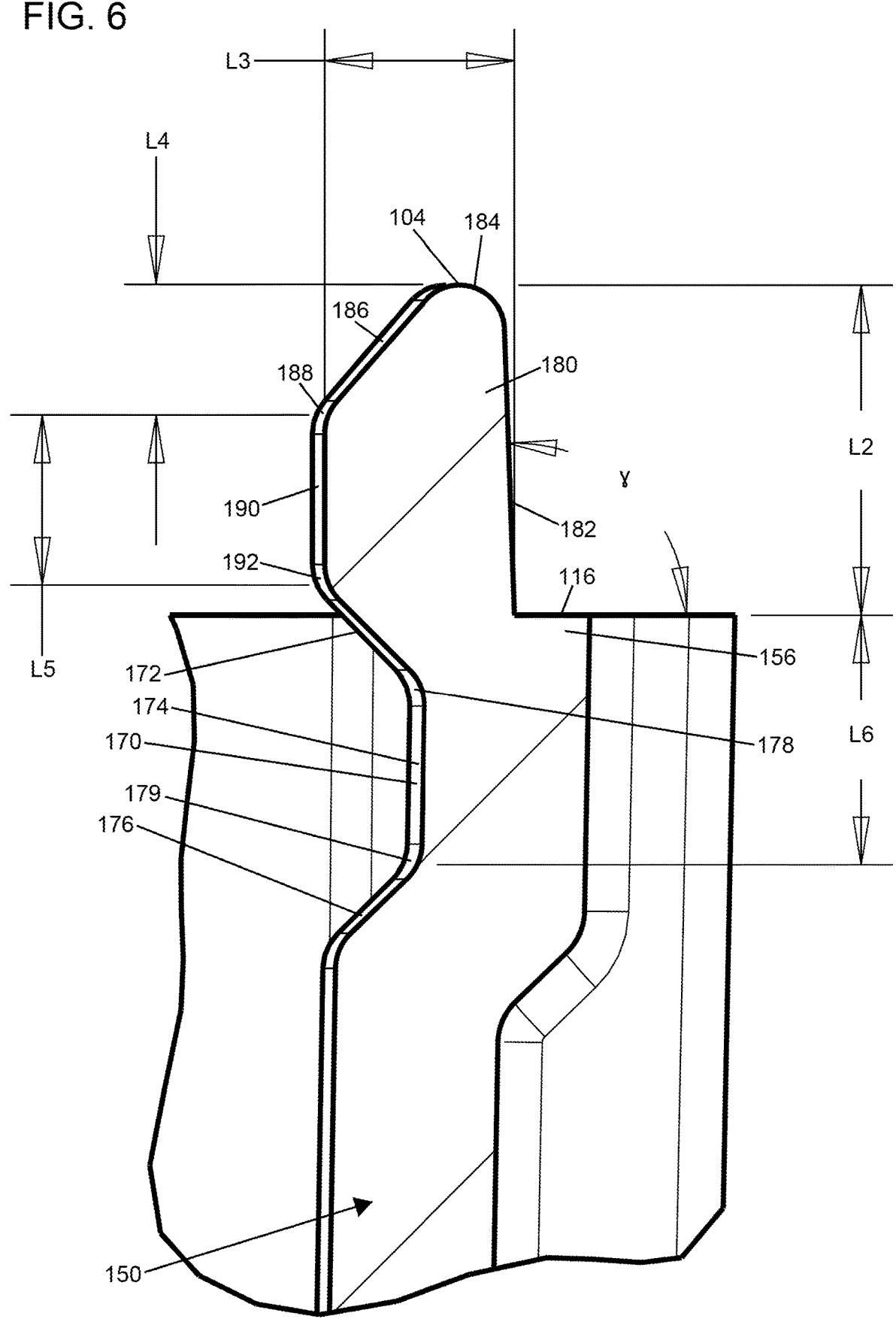
FIG. 6 is an enlarged portion of FIG. 5.

Turning now to FIGS. 5 and 6, additional details and features of the pair of opposing latches 150 will be described in detail. As illustrated at FIG. 6, a portion of the opposing latches 150 extends beyond the face 116 and beyond the interior portion 110 of the dust cap 100 by a distance L2. The dimension L2 may be 1.65 millimeters or about 1.65 millimeters in the depicted embodiment. In other embodiments, the dimension L2 may be 1.65±0.5 millimeters. In still other embodiments, the dimension L2 may have other values. The dimension L2 extends parallel to the longitudinal axis A1. In particular, latch tab 180 may at least partially be located along the length L2, beyond the interior portion 110. As illustrated at FIG. 5, the two portions of the respective two opposing latches 150 that extend beyond the face 116 are located a distance away from each other, defined by a dimension L11, that extends along the lateral direction D2. The dimension L11 may be 10.65 millimeters or about 10.65 millimeters in the depicted embodiment. In other embodiments, the dimension L11 may be 10.65±2 millimeters. In still other embodiments, the dimension L11 may have other values. In particular, the dimension L11 locates an opposing pair of outer sides 182 of the portions of the opposing latches 150 that extend beyond the face 116. The outer sides 182 may be revolved about the longitudinal axis A1.

As illustrated at FIG. 6, the outer sides 182 may define an angle γ from the face 116 and thereby extend slightly inwardly toward the longitudinal axis A1 as the outer sides 182 extend away from the face 116. The angle γ may be 92° or about 92° in the depicted embodiment. In other embodiments, the angle γ may be 92°±5°. In still other embodiments, the angle γ may have other values. As the outer sides 182 approach the limit of the dimension L2, the outer sides 182 blend into a radius tip 184. As depicted, the radius tip 184 includes the second end 104 of the dust cap 100. Upon the radius tip 184 reaching the second end 104, the radius tip 184 turns back toward the face 116. The radius tip 184 may be revolved about the longitudinal axis A1 and thereby define a partial toroidal shape. The radius tip 184 may tangentially blend into the outer side 182 and also tangentially blend with a ramp 186 that extends inwardly toward the longitudinal axis A1 and toward the face 116 as the ramp 186 extends away from the radius tip 184. The ramp 186 may be revolved about the longitudinal axis A1. As the ramp 186 continues toward the face 116, the ramp 186 tangentially blends with a radiused portion 188. The radiused portion 188 may be revolved about the longitudinal axis A1. As the radiused portion 188 extends toward the face 116, the radiused portion 188 tangentially blends with a full portion 190 of an engaging side of the latch tab 180.

The inner surface of the full portion 190 of the engaging side may be positioned a distance, defined by a dimension L3, away from the outer side 182 of the latch tab 180. The dimension L3 may be 0.95 millimeter or about 0.95 millimeter in the depicted embodiment. In other embodiments, the dimension L3 may be 0.95±0.4 millimeter. In still other embodiments, the dimension L3 may have other values. The inner surfaces of the full portions 190 of the latch tab 180 may be located away from each other by a distance, defined by a dimension L12. The dimension L12 may be 8.75 millimeters or about 8.75 millimeters in the depicted embodiment. In other embodiments, the dimension L12 may be 8.75±2 millimeters. In still other embodiments, the dimension L12 may have other values. The inner portions of the full portion 190 of the engaging side of the latch tabs 180 may be revolved about the longitudinal axis A1. As illustrated at FIG. 6, as the inner surface of the full portion 190 continues to extend toward the face 116, the inner surface of the full portion 190 tangentially blends with a radiused portion 192 that turns outwardly away from the longitudinal axis A1. The radiused portion 192 blends tangentially with a ramp 172.

As depicted, the ramp 172 extends on both sides of the face 116. The ramp 172 forms a transition portion or a part of a transition portion between the latch tab 180 and a latch recess 170. The ramp 172 may be revolved around the longitudinal axis A1. As the ramp 172 extends away from the face 116 and outwardly away from the longitudinal axis A1, the ramp 172 tangentially blends with a radiused portion 178. The radiused portion 178 may be revolved about the longitudinal axis A1. As the radiused portion 178 continues and extends away from the face 116, the radiused portion 178 tangentially blends with a full portion 174 of the latch recess 170. The full portion 174 may be revolved about the longitudinal axis A1.

As illustrated at FIG. 5, the pair of full portions 174 of the pair of latch recesses 170 may be located away from each other by a distance, defined by a dimension L13. The dimension L13 may be 9.75 millimeters or about 9.75 millimeters in the depicted embodiment. In other embodiments, the dimension L13 may be 9.75±2 millimeters. In still other embodiments, the dimension L13 may have other values. As the full portion 174 continues away from the face 116, the full portion 174 tangentially blends with a radiused portion 179. The radiused portion 179 may be revolved about the longitudinal axis A1. As the radiused portion 179 continues and extends away from the face 116, the radiused portion 179 tangentially blends with a ramp 176 that extends inwardly toward the longitudinal axis A1 as the ramp 176 extends away from the face 116. The ramp 176 may be revolved about the longitudinal axis A1.

Turing again to FIG. 6, a ramp zone of the latch tab 180 may be defined by a distance with a dimension L4. The dimension L4 may be 0.65 millimeter or about 0.65 millimeter in the depicted embodiment. In other embodiments, the dimension L4 may be 0.65±0.3 millimeter. In still other embodiments, the dimension L4 may have other values. The dimension L4 extends parallel to the longitudinal axis A1. A tab zone of the latch tab 180 may be defined by a distance that extends a dimension L5 parallel to the longitudinal axis A1. The dimension L5 may be 0.85 millimeter or about 0.85 millimeter in the depicted embodiment. In other embodiments, the dimension L5 may be 0.85±0.3 millimeter. In still other embodiments, the dimension L5 may have other values. The latch tab 180 may be referred to as a snap. A full zone of the latch recess 170 may extend a distance defined by a dimension L6 away from the sealing face 116 located within an interior portion 110 of the dust cap 100. The dimension L6 may be 1.25 millimeter or about 1.25 millimeter in the depicted embodiment. In other embodiments, the dimension L6 may be 1.25±0.5 millimeter. In still other embodiments, the dimension L6 may have other values.

Turning now to FIG. 8, the extent (i.e., a width) of the opposing latches 150 in a transverse direction D3 (see FIG. 4) will be described. As shown at FIG. 4, the transverse direction D3 extends parallel to the transverse axis A3. The opposing latches 150 each extend between a pair of opposing sides 194. As depicted, the opposing sides 194 may each define an outer portion of the flanges of the C-structure 160. The two opposite sides 194 of each of the opposing latches 150 may respectively lie in two planes that intersect the longitudinal axis A1. Additional fillets and/or transitions 196 may be included to blend various portions of features of the opposing latches 150 to adjacent features. The fillets and/or transitions 196 may further blend features of the opposing latches 150 with the walls 122, 126.

Turning now to FIGS. 2, 5, 7, and 8, longitudinal ribs 210 extend from a first end 212 to a second end 214. As depicted, the longitudinal ribs 210 are parallel or substantially parallel to the longitudinal axis A1. The longitudinal ribs 210 are defined on interior surfaces of the opposing third and fourth walls 128. The first end 212 of the longitudinal ribs 210 may extend to the end wall 122. The second end 214 of the longitudinal ribs 210 may extend to the face 116. A ramp 216 may be at the second end 214 of the longitudinal rib 210 and thereby transition the longitudinal rib 210 to the face 116. Each of the opposing third and fourth walls 128 may include a pair of the longitudinal ribs 210, spaced apart from each other. A channel 220 may be formed between each of the pair of the longitudinal ribs 210. One of the channels 220 may hold a single key 336 of a fiber optic connector, further described hereinafter, at a time. By having two opposite channels 220, the dust cap 100 may be reversible (i.e., installable in two orientations on the keyed fiber optic connector).

The exterior portion 112 may define an exterior perimeter 242 of the dust cap 100. The exterior perimeter 242 may collectively include exterior features that define an exterior envelope of the dust cap 100. For example, features associated with the dimensions Ø1, L9, L10, α, β, and L1 may collectively define the exterior perimeter 242, among other dimensions and/or features.

Turning now to FIG. 9, a prior art fiber optic connector and cable assembly 250 will be described. As depicted at FIG. 9, the fiber optic connector and cable assembly 250 is fitted with a dust cap 510 that is assembled on an end portion of the fiber optic connector and cable assembly 250. As is known in the art, the dust cap 510 may rely on friction to keep from falling off of the end portion of the fiber optic connector and cable assembly 250, and no latches or catches are used to retain the dust cap 510 on the end portion of the fiber optic connector and cable assembly 250. A prior art connector and cable assembly with dust cap 500 is defined as the assembly of the dust cap 510 onto the fiber optic connector and cable assembly 250.

The fiber optic connector and cable assembly 250 includes a connectorized end 252. A fiber optic cable 260 includes at least one optical fiber 262. The optical fiber 262 may be surrounded by a buffer tube 264. A jacket 268 may cover the optical fiber 262 and/or the buffer tube 264. At least one strength member 266 may further be covered by the jacket 268. The cable 260 extends to the connectorized end 252 of the fiber optic connector and cable assembly 250. An opposite end of the cable 260 may be additionally connectorized at an opposite connectorized end. The fiber optic connector and cable assembly 250 may be an MPO patch-cord. The connectorized end 252 includes a prior art fiber optic connector 300. As depicted, the fiber optic connector 300 may be an MPO connector.

Figure 15:
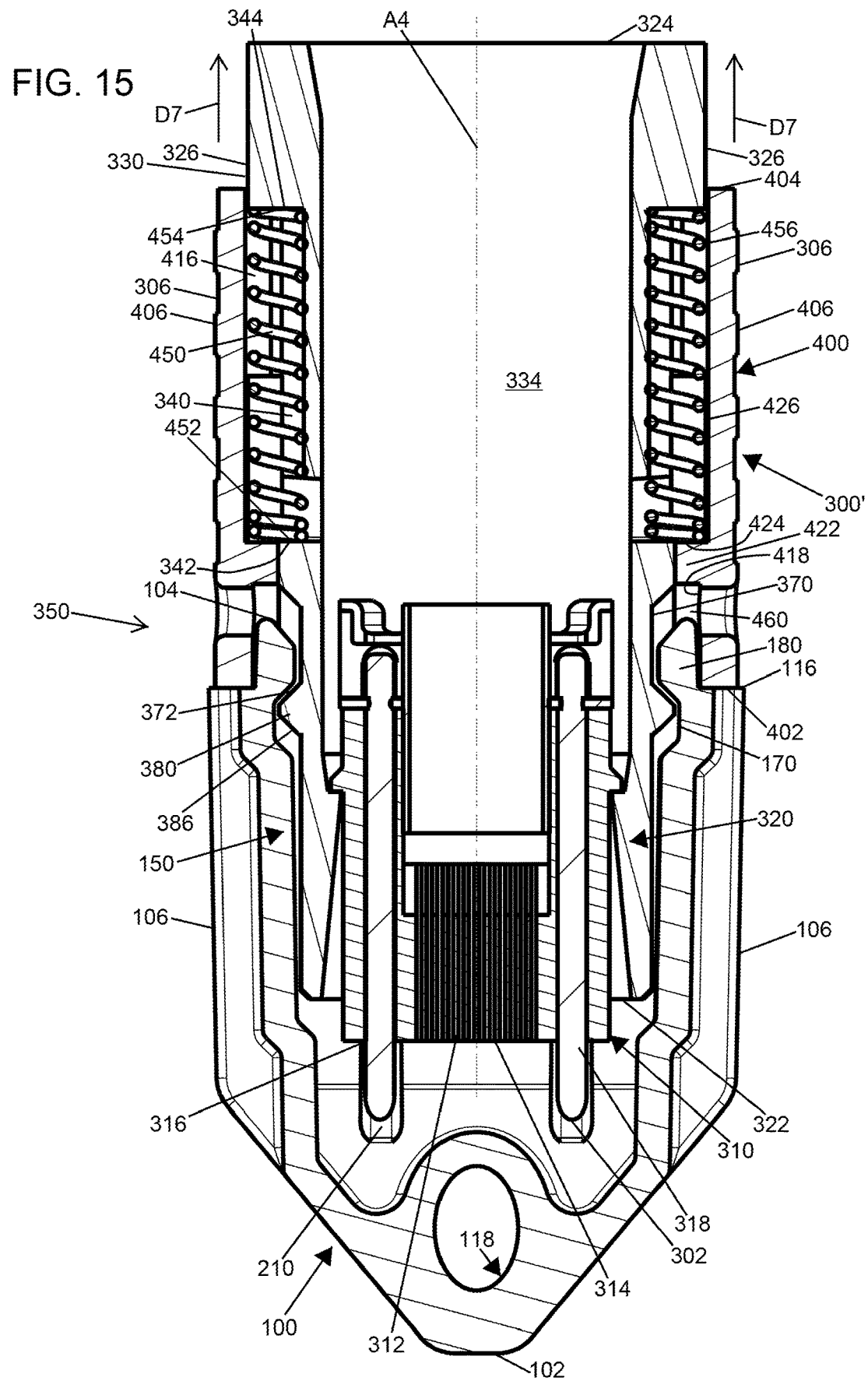
FIG. 15 is a cross-sectional plan view of the dust cap of FIG. 1 installed on the portions of the fiber optic connector of FIG. 10.
Figure 16:
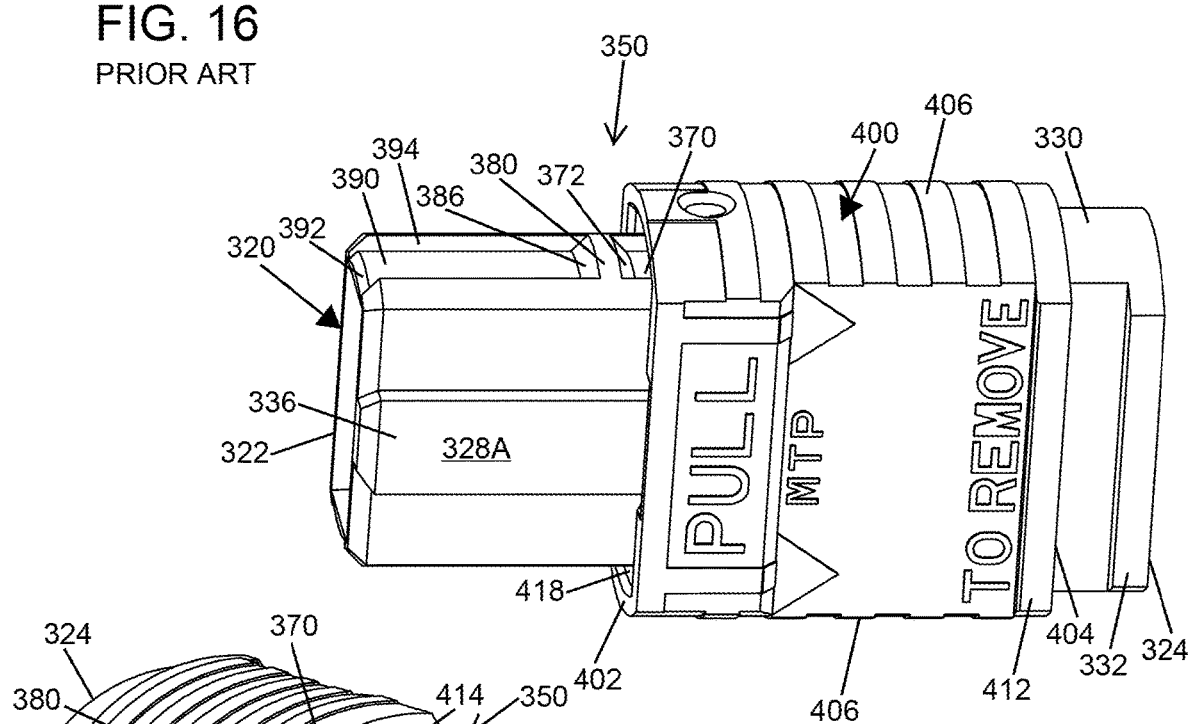
FIG. 16 is a perspective view of a prior art connector body and a prior art release sleeve of the prior art fiber optic connector of FIG. 10.
Figure 17:
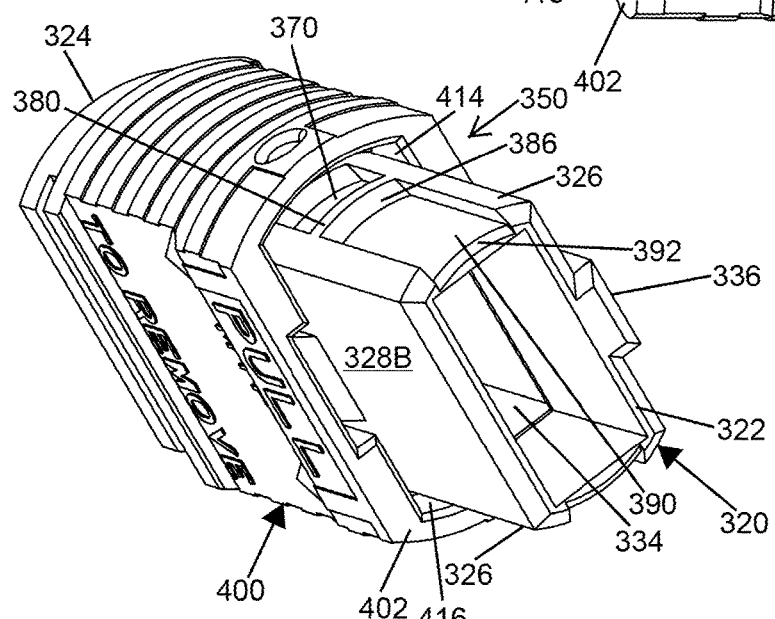
FIG. 17 is another perspective view of the prior art connector body and the prior art release sleeve of FIG. 16.
Figure 18:
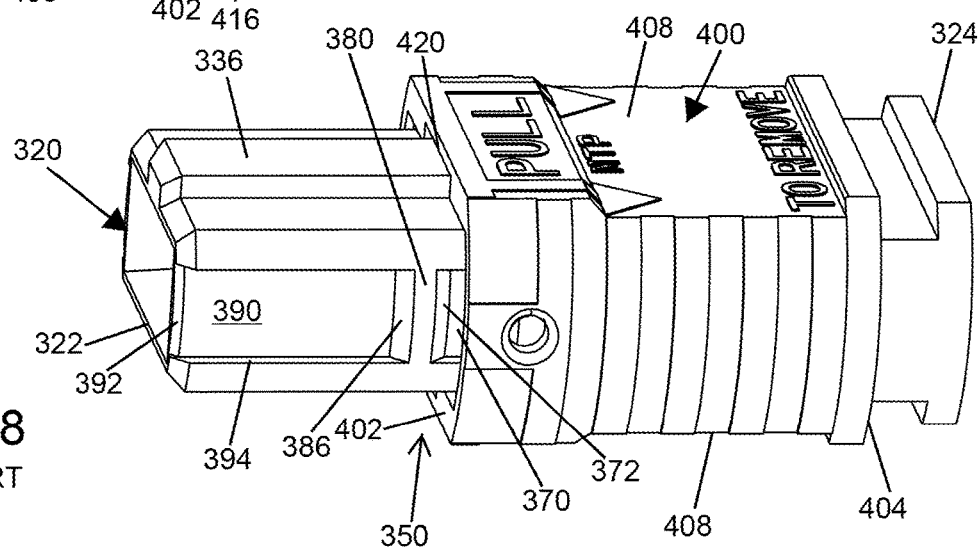
FIG. 18 is still another perspective view of the prior art connector body and the prior art release sleeve of FIG. 16.
Figure 19:
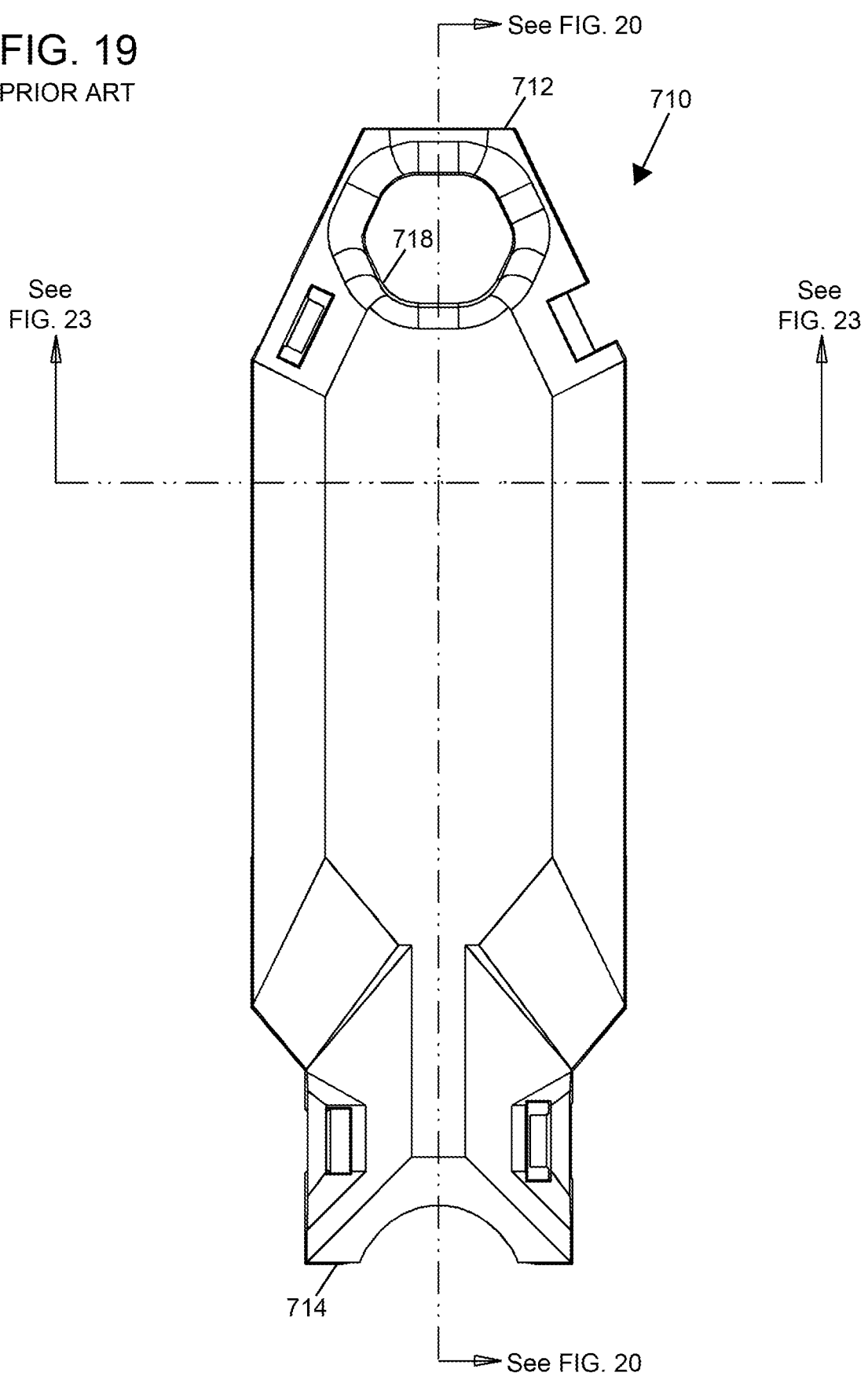
FIG. 19 is a plan view of a half of a prior art split pulling eye assembly.

The fiber optic connector 300 extends between a first end 302 and a second end 304 (see FIGS. 9 and 15). The fiber optic connector 300 may extend between opposite first and second sides 306. The fiber optic connector 300 may further extend between opposite third and fourth sides 308. The opposite third and fourth sides 308 may include a keyed side 308A and an unkeyed side 308B. As further illustrated at FIG. 15, the fiber optic connector 300 includes a ferrule 310. The ferrule 310 includes a plurality of fiber passages 312 that terminate at fiber passage end positions 314. The ferrule 310 further includes a pair of pin holes 316. In certain embodiments, the pair of pin holes 316 each include a pair of pins 318 and thereby define a male fiber optic connector 300. In other embodiments, the pair of pin holes 316 may not include the pair of pins 318 and thereby define a female fiber optic connector 300. In still other embodiments, the pair of pin holes 316 may include a pin 318 in one of the pin holes 316 and no pin in another of the pin holes 316.

The fiber optic connector 300 includes a connector body 320. The connector body 320 extends between a first end 322 and a second end 324. The connector body 320 may further extend between opposite first and second sides 326. The connector body 320 may further extend between opposite third and fourth sides 328. The connector body 320 may define a longitudinal axis A4. The opposite first and second sides 326 of the connector body 320 may revolve about the longitudinal axis A4. The pair of opposed third and fourth sides 328 may include a keyed side 328A and an unkeyed side 328B. The keyed side 328A corresponds with the keyed side 308A of the fiber optic connector 300, and the unkeyed side 328B corresponds with the unkeyed side 308B of the fiber optic connector 300. The connector body 320 further includes a slide 330 and a flange 332 (e.g., a slide stop). The connector body 320 includes a central passage 334 that may enclose the ferrule 310. The connector body 320 may include the key 336 on the keyed side 328A. The connector body 320 includes a pair of spring pockets 340. Each of the pair of the spring pockets 340 includes a first end 342 and a second end 344.

The connector body 320 includes a pair of opposed catches 350. The latch recesses 170 and the latch tabs 180 of the opposing latches 150 of the dust cap 100, mentioned above, are complimentary to the opposed catches 350 of the connector body 320 of the fiber optic connector 300. The opposed catches 350 each include a catch recess 370 and a catch tab 380. As illustrated at FIGS. 15-18, a ramp 372 may extend between the catch tab 380 and the catch recess 370. The connector body 320 may include a chamfer 392 at the first end 322 of the connector body 320. The chamfer 392 may transition to a channel 390 of the connector body 320. The channel 390 extends from the chamfer 392 to a ramp 386. The ramp 386 is formed on the catch tab 380. The catch tab 380 may be termed a catch rib, etc. The channel 390 is formed between a pair of channel sides 394.

The fiber optic connector 300 further includes a sleeve 400. The sleeve 400 may be termed an MPO connector outer sleeve. The sleeve 400 extends between a first end 402 and a second end 404, as depicted at FIGS. 15-18. The sleeve 400 may extend between opposite first and second sides 406. The opposite first and second sides 406 of the sleeve 400 may be revolved about the longitudinal axis A4 of the fiber optic connector 300. The sleeve 400 may further extend between opposite third and fourth sides 408. Pulling grips 410 may be defined on the pair of opposite first and second sides 406. The sleeve 400 may further include a flange 412. The flange 412 may serve as a slide stop and/or a finger grip. The sleeve 400 may further include an interior slide 414 (see FIGS. 12 and 17). The sleeve 400 may include an interior 416 that defines the slide 414. The interior 416 may further define a latch capturing surface 418 and a pair of channels 420. As illustrated at FIG. 15, the interior 416 of the sleeve 400 may include a flange 422 (i.e., a spring engaging flange). The flange 422 may include an axial spring engaging surface 424. The interior 416 of the sleeve 400 may further include lateral spring retaining surfaces 426.

Turning again to FIG. 9 and FIG. 45, the fiber optic connector 300 may include a spring push 430. The spring push 430 may serve as a spring push for a ferrule biasing spring 470. The spring push 430 may further function as a cable anchor 430 that joins the fiber optic cable 260 to the connector body 320 of the fiber optic connector 300. In particular, the strength members 266 may be crimped about a crimping anvil 438 of the spring push 430 and thereby be secured to the spring push 430. The spring push 430 includes a connector attaching end 432 that attaches to the connector body 320 and a cable attaching end 434 that attaches to the fiber optic cable 260. The spring push 430 may further define a flange 436 that abuts the second end 324 of the connector body 320. The fiber optic connector 300 may further include a boot 440 (i.e., a cable strain relief). The boot 440 extends between a first end 442 and a second end 444.

Turning again to FIG. 15 and FIGS. 46 and 47, the fiber optic connector 300 further includes a pair of sleeve springs 450. The sleeve springs 450 extend between a first end 452 and a second end 454 and define a radial circumference 456. As depicted at FIGS. 15, 47, and 49, the pair of sleeve springs 450 are mounted within the pair of spring pockets 340 of the connector body 320. The sleeve springs 450 may extend between the first end 342 and the second end 344 of the spring pockets 340 and may be preloaded when mounted within the pair of spring pockets 340.

As depicted at FIGS. 47 and 49, the sleeve springs 450 extend a variable length L14. FIG. 47 illustrates the length L14 of the sleeve springs 450 at a resting length L14r. As depicted, at the resting length L14r, the sleeve springs 450 extend between the first end 342 and the second end 344 of the spring pockets 340 and may be preloaded by the spring pockets 340, respectively. FIG. 49 illustrates the length L14 of the sleeve springs 450 at a compressed length L14c. As depicted, at the compressed length L14c, the sleeve springs 450 extend between the axial spring engaging surface 424 of the flange 422 of the sleeve 400 and the second end 344 of the spring pockets 340, respectively. As depicted at FIGS. 15 and 47, the axial spring engaging surfaces 424 may also engage the first ends 452 of the sleeve springs 450 when the sleeve springs 450 are at the resting length L14r. The lateral spring engaging surfaces 426 may keep the sleeve springs 450 within the pair of spring pockets 340 by engaging the radial circumference 456 of the sleeve spring 450.

The sleeve 400 slides on the connector body 320. In particular, the interior slide 414 of the sleeve 400 slides on the slide 330 of the connector body 320 parallel to the longitudinal axis A4. A variable dimension L15 (see FIGS. 47 and 49) may be used to characterize the variable position of the sleeve 400 as it slides on the connector body 320. At FIG. 47, the dimension L15 is at a resting dimension L15r, the sleeve 400 is at a resting position, and the sleeve springs 450 are at the resting length L14r. At FIG. 49, the dimension L15 is at a compressed dimension L15c, the sleeve 400 is at a preloaded position, and the sleeve springs 450 are at a compressed length L14c. Further movement of the sleeve 400 in the sleeve release direction D7 further lengthens the dimension L15 and moves the sleeve 400 toward a releasing position, further described below.

Upon assembly of the sleeve 400 and the pair of sleeve springs 450 onto the connector body 320, the sleeve 400 is urged to the resting position (a capturing position, a latched position, a distal position, a catch recess opening position, etc.), as shown at FIGS. 15 and 47. In particular, as the pair of sleeve springs 450 are constrained within the pair of spring pockets 340 and between the first end 342 and the second end 344 of the spring pockets 340 (at the resting length L14r), the pair of sleeve springs 450 do not bias the sleeve 400 when the sleeve 400 is at the resting position. However, when the sleeve 400 is moved along the direction D7 (see FIG. 15), to, toward, or beyond the position illustrated at FIG. 49, the axial spring engaging surface 424 of the sleeve 400 compresses the sleeve spring 450 and the sleeve 400 is biased opposite the direction D7. As illustrated at FIGS. 10, 16-18, 46, and 48, the sleeve 400 is limited in movement in the direction D7 by the flange 412 of the sleeve 400 abutting the flange 332 of the connector body 320. When the sleeve 400 is at or near the resting position, the latch capturing surfaces 418 and the catch recess 370 form a latching pocket 460 on each of the opposite sides 306 of the fiber optic connector 300.

Figure 31:
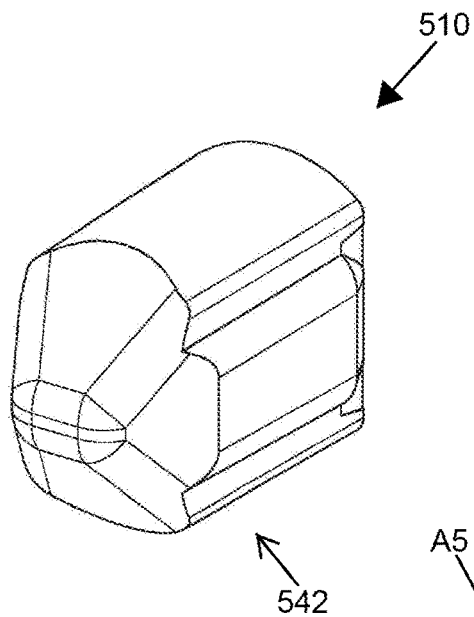
FIG. 31 is a perspective view of a prior art dust cap.
Figure 32:
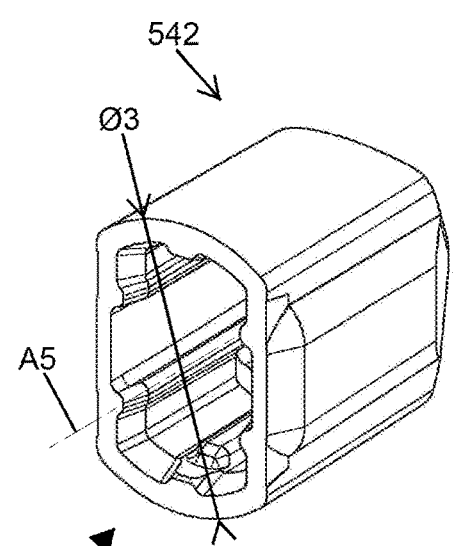
FIG. 32 is another perspective view of the prior art dust cap of FIG. 31.

Turning again to FIG. 9 and to FIGS. 31 and 32, the dust cap 510 will be further described. As illustrated, the dust cap 510 may take on several embodiments that are known in the art. The dust cap 510 does not include latches to connect to the fiber optic connector 300. Instead, an interior of the dust cap 510 forms a friction fit with an exterior portion of the connector body 320, as the connector body 320 protrudes from the sleeve 400. As the dust cap 510 does not include a positive mechanical connection to the fiber optic connector 300, the dust cap 510 is not useful for pulling on the fiber optic connector and cable assembly 250. Furthermore, the dust cap 510 does not include a pulling eye for engaging a pulling member, such as the pulling member 1010. Nonetheless, the dust cap 510, in various configurations, is in wide use to protect the first end 302 of the fiber optic connector and to keep the fiber optic connector 300 free from contaminants, such as dust, at the first end 302.

The dust cap 510 defines an exterior perimeter 542. For example, a diametral dimension Ø3 encompasses a radial extent of the dust cap 510. In particular, the dust cap 510 defines a longitudinal axis A5. The longitudinal axis A5 is coincident with the longitudinal axis A4 of the fiber optic connector 300 when the dust cap 510 is installed on the fiber optic connector 300. The diametral dimension Ø3 is centered about the longitudinal axis A5. The dust cap 510 may further include additional features such as a nose that further defines the exterior perimeter 542.

As will be further described hereinafter, the exterior perimeter 242 of the dust cap 100 may be the same as, similar to, or smaller than the exterior perimeter 542 of the dust cap 510. The dust cap 100 may thereby be used in place of the dust cap 510 without occupying additional exterior space. The dust cap 100 may thereby fit within various locations occupied by the dust cap 510.

Figures 36, 37:
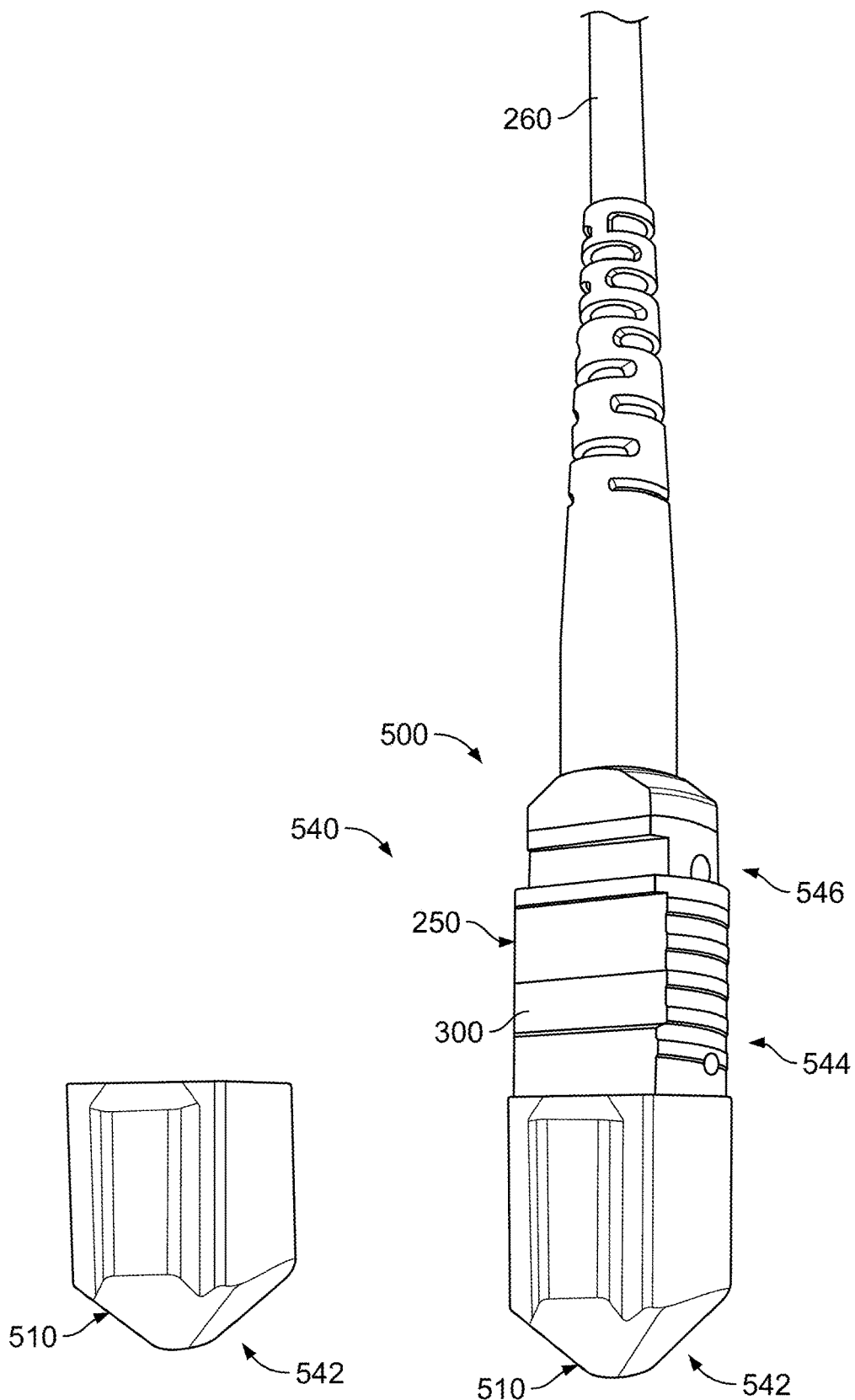
FIG. 36 is a perspective view of the prior art dust cap of FIG. 31.
FIG. 37 is a perspective view of the prior art dust cap of FIG. 31 installed on the prior art fiber optic connector and cable assembly of FIG. 9.

Turning now to FIGS. 36 and 37, the prior art dust cap 510 is illustrated with similar or the same features as the dust cap 510 of FIGS. 31 and 32. FIG. 37 illustrates the dust cap 510 mounted on the prior art fiber optic connector 300 of the prior art fiber optic connector and cable assembly 250 thereby forming the fiber optic connector and cable assembly with dust cap 500. The connector body 320 and the release sleeve 400 define an exterior perimeter 544 of the fiber optic connector body 320 and the release sleeve 400 combined. The spring push 430 defines an exterior perimeter 546 of the spring push 430. Collectively taken together, the exterior perimeters 542, 544, 546 collectively define an exterior perimeter 540 of the connector and cable assembly with dust cap 500.

Turning now to FIGS. 38 and 39, the dust cap 100 is illustrated at FIG. 38 and defines the exterior perimeter 242. As the exterior perimeter 242 is the same as, similar to, or smaller than the exterior perimeter 542, the assembly of FIG. 39 may also fit within the exterior perimeter 540. In particular, FIG. 39 illustrates the dust cap 100 assembled to the prior art fiber optic connector 300 of the prior art fiber optic connector and cable assembly 250 and thereby forms a connector and cable assembly with pulling eye 600. The connector and cable assembly with pulling eye 600 may also include an exterior perimeter 540 that matches the exterior perimeter 540 of the connector and cable assembly with dust cap 500 of FIG. 37.

Turning again to FIGS. 10-15 and 46-49, installation of the dust cap 100 onto the prior art fiber optic connector 300 will be described in detail. For purposes of illustration, a complete fiber optic connector 300 is not shown at FIG. 10-15 or 42-49. Instead, a partial fiber optic connector 300' is illustrated in assembling the dust cap 100 to the fiber optic connector 300 at FIGS. 10-15 and 46-49. The partial fiber optic connector 300' does not include, for example, the spring push 430, the boot 440, or the fiber optic cable 260. Similarly, FIGS. 16-18 only include the connector body 320 and the sleeve 400 of the fiber optic connector 300, for purposes of illustration.

To assemble the dust cap 100 onto the fiber optic connector 300, the opposing latches 150 may be aligned with the channels 390 of the connector body 320. In particular, the ramps 186 may be positioned against the chamfers 392. In addition, the opposite sides 194 of the opposing latches 150 should be aligned within the channel 390 of the connector body 320. The channel sides 394 may serve as a guide to the opposing sides 194 and thereby guide the dust cap 100 onto the connector body 320.

Initially, the latch tabs 180 may need to be spread apart from each other to occupy the opposing channels 390, respectively. The chamfers 392, together with the ramps 186, may serve to spread the latch tabs 180 apart from each other as the dust cap 100 is advanced in an installation direction D4 (see FIG. 5). The latch tabs 180 may occupy a portion of the channels 390. Next, the latch recesses 170 may be positioned over portions of the opposing channels 390, respectively, (see FIG. 47). Next, a substantial portion of the inwardly facing surfaces of the opposing latches 150 at the interior portion 110 of the dust cap 100 may occupy a substantial portion of the channels 390, respectively. Next, the ramps 186 of the latch tabs 180 may engage the ramps 386 of the catch tab 380.

Upon further movement of the dust cap 100 in the installation direction D4, the opposing ramps 386 may spread apart the latch tabs 180 in the directions D5, respectively, and thereby allow the full portion 190 of the latch tabs 180 to extend over the catch tab 380. The latch tabs 180 are thereby moved to a spread position, a decoupling position, an actuated position, a strained position, etc. At or about the same time, the radius tip 184 of the latch tab 180 may press against the first end 402 of the sleeve 400 and thereby move the sleeve in the installation direction D4. Thus, it is not necessarily required to separately actuate the sleeve 400. Alternatively, the sleeve 400 may be moved in the direction D4 separately from the dust cap 100. As the opposing latches 150 and, in particular, the latch tabs 180 are spread apart, the opposite first and second walls 126 of the dust cap 100 are deformed thereby allowing the flexibly mounted portions 156 of the opposing latches 150 to resiliently allow the opposing latch tabs 180 to advance to the opposing catch recesses 370 of the opposing catches 350. As illustrated at FIGS. 15 and 49, upon the opposing latch tabs 180 reaching the opposing catch recesses 370, the opposing latch tabs 180 may return inwardly to a coupling position and occupy the opposing catch recesses 370. As the latch tabs 180 move inwardly, the sleeve 400 is free to return to the resting position, as illustrated at FIGS. 15 and 49. The pair of sleeve springs 450 may urge the sleeve 400 to return to the resting position. As the sleeve 400 moves opposite the installation direction D4, portions of the interior 416 of the sleeve 400 cover at least portions of the catch recesses 370 and thereby form the pair of latching pockets 460 and thereby trap the latch tabs 180 within the latching pockets 460. Upon installation of the dust cap 100 on the fiber optic connector 300, the dust cap 100 and the fiber optic connector 300 are attached together. In particular, upon pulling the installed dust cap 100 opposite the installation direction D4, the pair of opposing ramps 172 engage the pair of opposing ramps 372 and thereby urge the latch tabs 180 to spread apart in the outward directions D5. However, the portions of the interior 416 of the sleeve 400 block the latch tabs 180 from spreading apart and thereby lock the dust cap 100 to the fiber optic connector 300.

As depicted at FIG. 15, the pair of sleeve springs 450 are bottomed out in the spring pockets 340 between the first end 342 and the second end 344. Thus, each of the pair of latch tabs 180 are trapped within the latching pocket 460, but no substantial preload is applied by the first end 402 of the sleeve 400 against the face 116 of the dust cap 100.

In the embodiment depicted at FIG. 49, the catch tab 380 and/or the latch tab 180 may be longer along a longitudinal direction D1 (see FIG. 5) and thereby cause the pair of sleeve springs 450 to preload the face 116 of the dust cap 100 and further preload the ramps 172 against the ramps 372. In this preloading embodiment, the sleeve 400 may be positioned in the sleeve release direction D7 when the dust cap 100 is installed onto the fiber optic connector 300. The pair of sleeve springs 450 are thereby compressed between the axial spring engaging surfaces 424 of the spring engaging flange 422 and the second end 344 of the spring pocket 340. Such preloading may encourage a tight seal between the first end 402 of the sleeve 400 and the sealing face 116 of the dust cap 100.

To remove the dust cap 100 from the fiber optic connector 300, the sleeve 400 is pulled in the sleeve release direction D7 to the releasing position (i.e., a retracted position, a catch recess opening position, a proximal position, an unlatched position, etc.) thereby further compressing the sleeve springs 450. By moving the sleeve 400 in the sleeve release direction D7, the portion of the interior 416 uncovers the catch recess 370 of the opposing catches 350 of the connector body 320 and thereby dismantles the latching pocket 460. With the latching pocket 460 dismantled, pulling of the dust cap 100 in a direction opposite the installation direction D4 spreads the latch tabs 180 apart in the outward directions D5 and thereby releases the dust cap 100 from the fiber optic connector 300. In particular, the pair of opposing ramps 172 engage the pair of opposing ramps 372 and thereby urge the latch tabs 180 in the outward directions D5. Upon the latch tabs 180 clearing the catch tabs 380, the latch tabs 180 resiliently return to the position illustrated at FIG. 5 (i.e., a relaxed position, an unstrained position, etc.). The sleeve 400 may be released and thereby return to the resting position (see FIGS. 15 and 47), where the pair of sleeve springs 450 are bottomed out at the first and second ends 342, 344 of the pair of spring pockets 340. The inwardly facing portions of the C-structure 160 of the dust cap 100 may be further slid along the channel 390 until the dust cap 100 is completely removed from the fiber optic connector 300.

Turning now to FIG. 39, the connector and cable assembly with pulling eye 600 is illustrated adjacent a conduit 1000 with a pulling member 1010 looped through the pulling interface 118 of the dust cap 100. The pulling member 1010 is further routed through the conduit 1000. As depicted at FIG. 39, the conduit 1000 has an inside cross-dimension Ø2 that is close to the encompassing diameter Ø1 of the dust cap 100, as described above. The encompassing diameter Ø1 is at or very close to a cross-dimension of the fiber optic connector 300. Thus, the dust cap 100 is able to pull the fiber optic connector and cable assembly 250 through a conduit 1000 with an inside cross-dimension Ø2 near to or the same as the cross-dimension of the fiber optic connector 300. Other prior art pulling devices include cross-dimensions substantially larger than the cross-dimension of the fiber optic connector 300 and thereby limit cable routing conduits to conduits having a sufficiently large cross-dimension that can accommodate the larger cross-dimension of the prior art pulling device.

The pulling member 1010 may further be routed through the conduit 1000 and the pulling member 1010 may be pulled from the opposite end of the conduit 1000 and thereby pull the connector and cable assembly with pulling eye 600 through the conduit 1000.

A tapered shape of the nose 114 of the dust cap 100 may guide the connector and cable assembly with pulling eye 600 across shoulders and other obstacles without getting caught on the shoulder or obstacle. The tapered shape of the nose 114 may further nudge certain obstacles out of the way as the connector and cable assembly with pulling eye 600 passes through the conduit 1000.

Turning now to FIGS. 19-30, a prior art split pulling eye assembly half 710 is illustrated. As further illustrated at FIGS. 33-35, two of the pulling eye halves 710 may be assembled together and thereby form a pulling assembly 700.

The pulling assembly 700 may extend between a first end 702 and a second end 704. The pulling assembly 700 includes a cable opening 706 at the second end 704. The pulling assembly includes a pulling interface 718 at or near the first end 702. The pulling assembly 700 may include variations in the pulling interface 718. For example, at FIG. 35, a pulling interface 718' is illustrated that is somewhat smaller than the pulling interface 718 illustrated at FIG. 19. The pulling assembly 700 may use two identical pulling eye halves 710 that latch to each other in a removable manner.

Turning again to FIGS. 19-30, the pulling eye half 710 will be described in detail. The pulling eye half 710 extends between a first end 712 and a second end 714. The pulling eye half 710 includes a cable opening 716 at the second end 714. The pulling eye half 710 includes a pulling interface 718, 718' at or near the first end 712.

Figure 22:
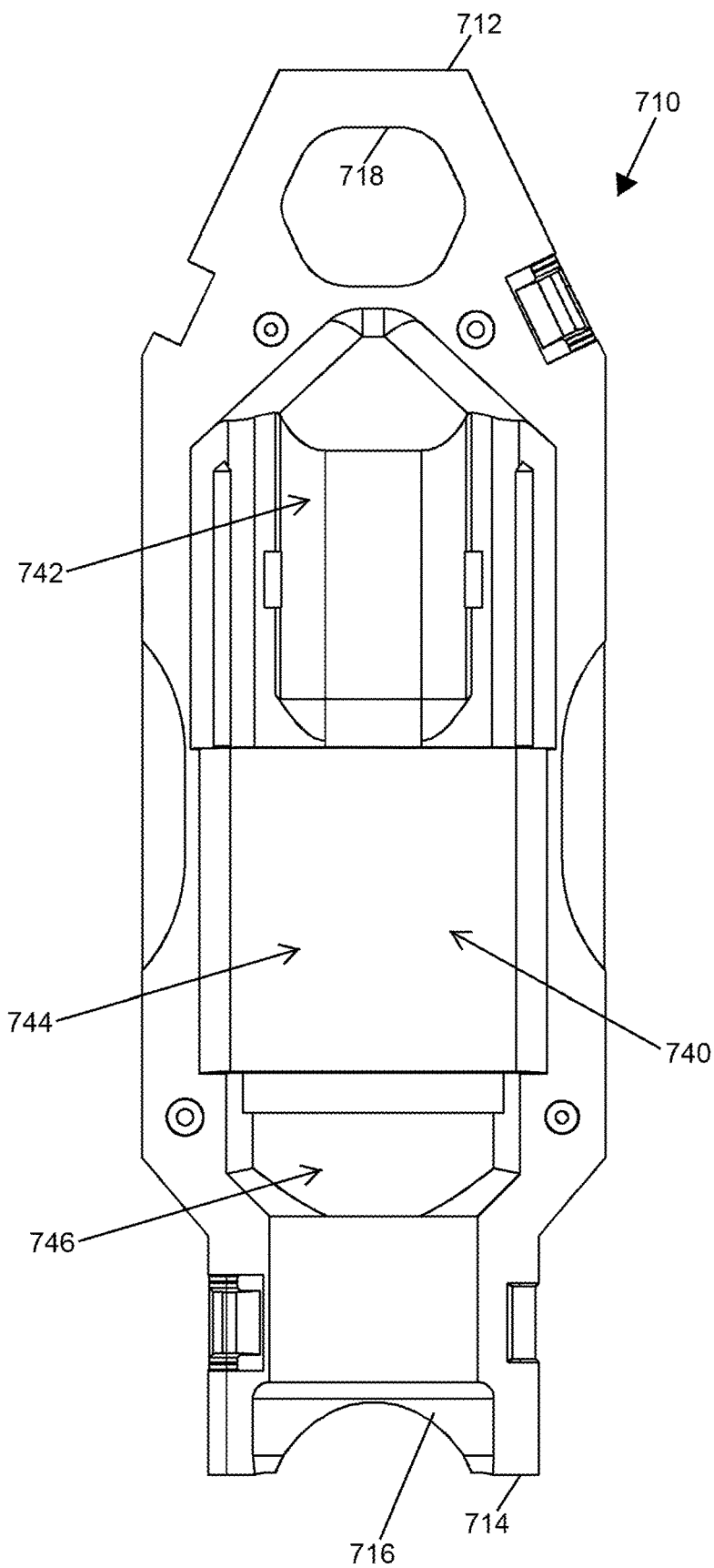
FIG. 22 is an opposite plan view of the half of the prior art split pulling eye assembly of FIG. 19.
Figure 23:
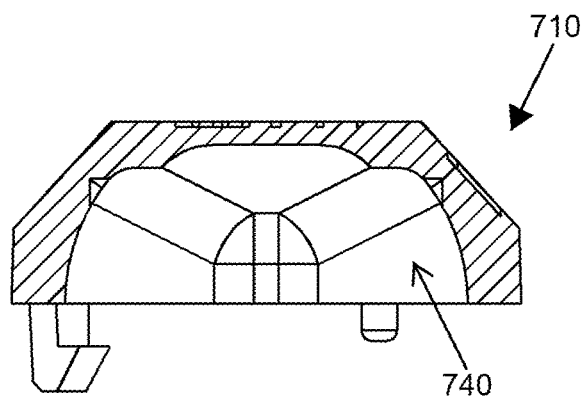
FIG. 23 is a cross-sectional end view of the half of the prior art split pulling eye assembly of FIG. 19, as called out at FIG. 19.
Figure 24:
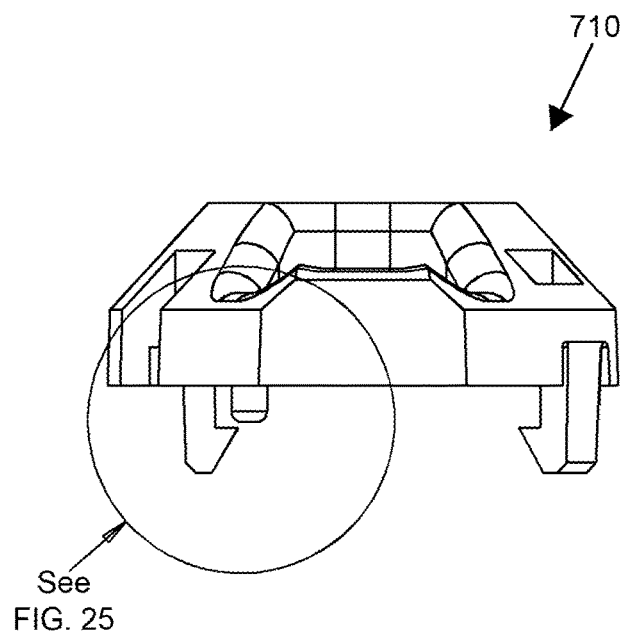
FIG. 24 is an opposite end view of the half of the prior art split pulling eye assembly of FIG. 19.
Figure 25:
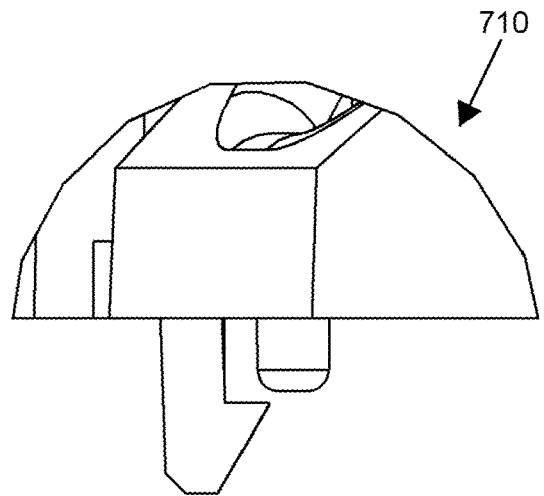
FIG. 25 is an enlarged portion of FIG. 24.
Figure 26:
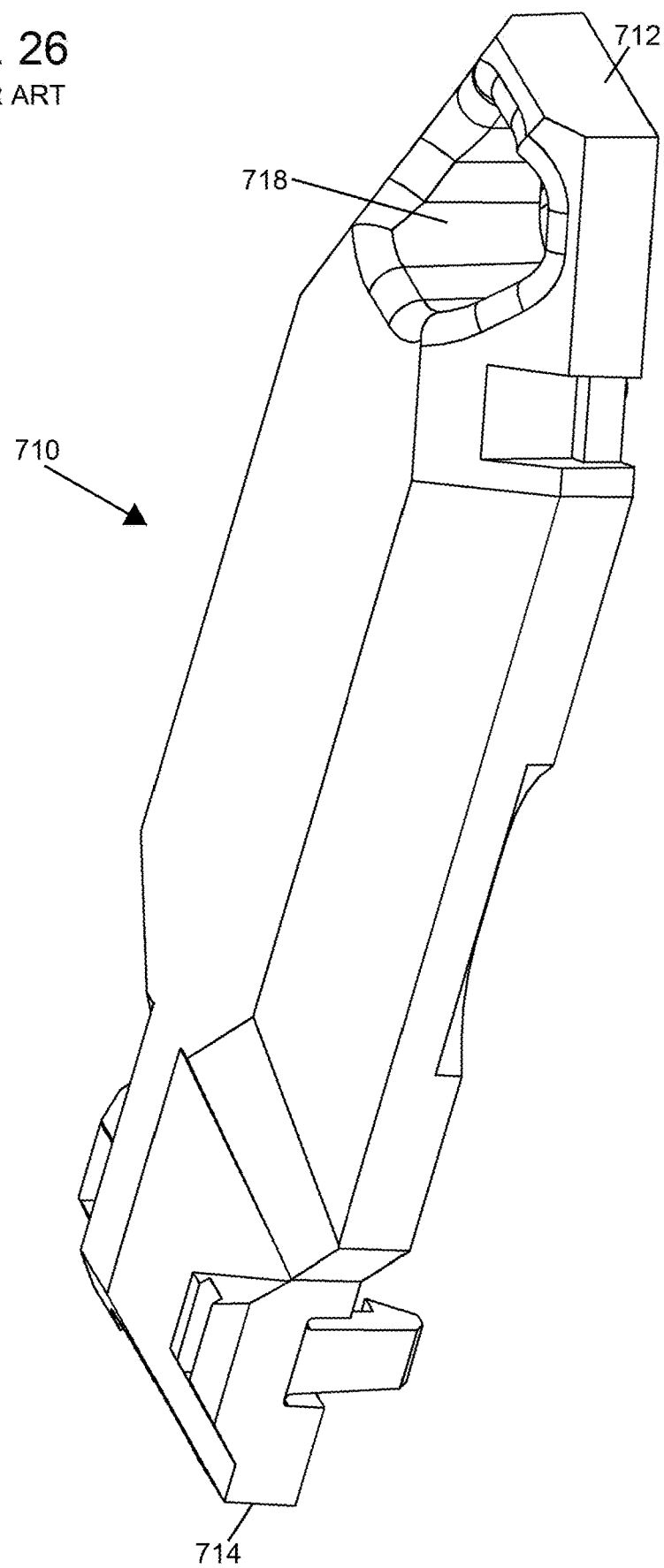
FIG. 26 is a perspective view of the half of the prior art split pulling eye assembly of FIG. 19.
Figure 27:
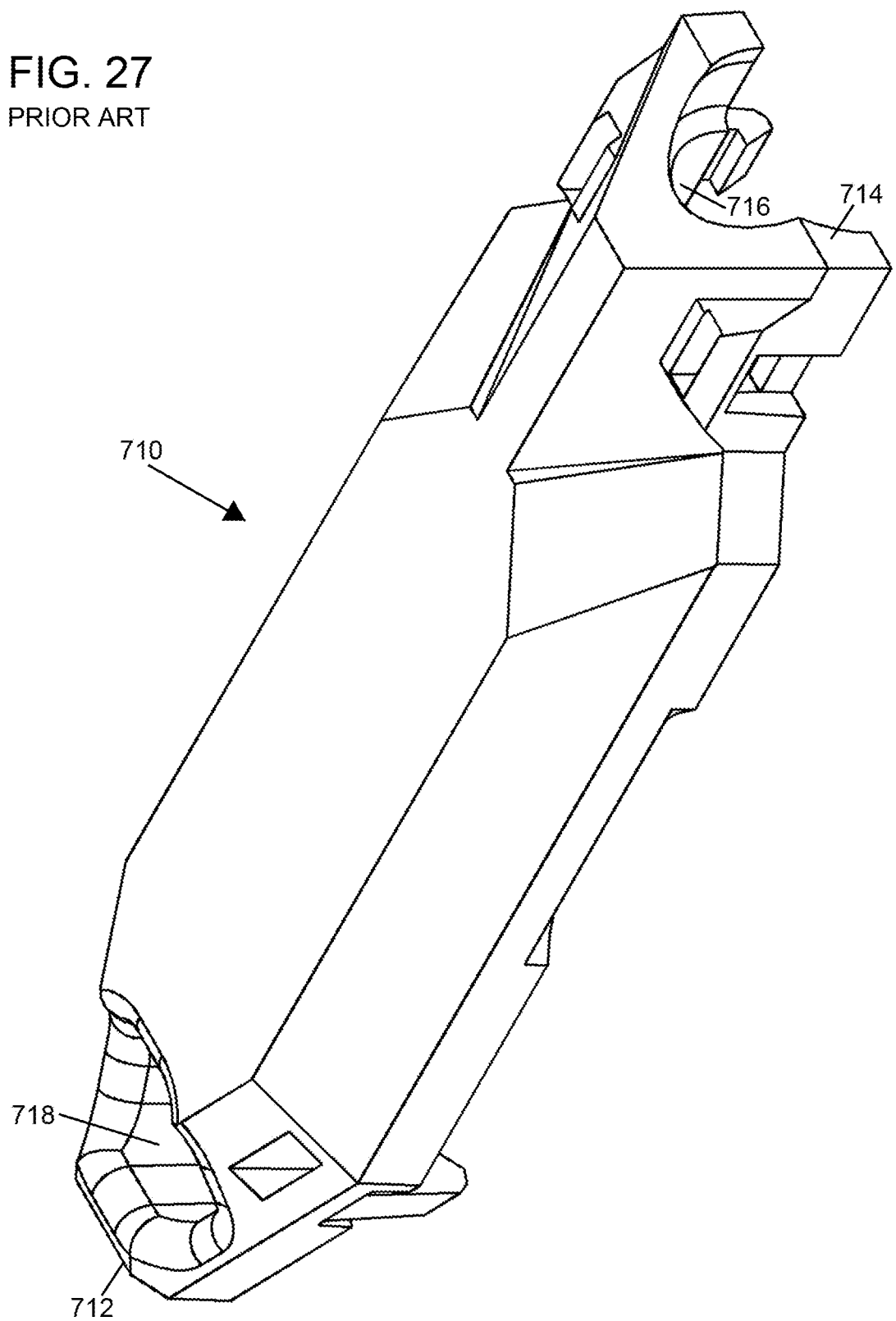
FIG. 27 is another perspective view of the half of the prior art split pulling eye assembly of FIG. 19.
Figure 28:
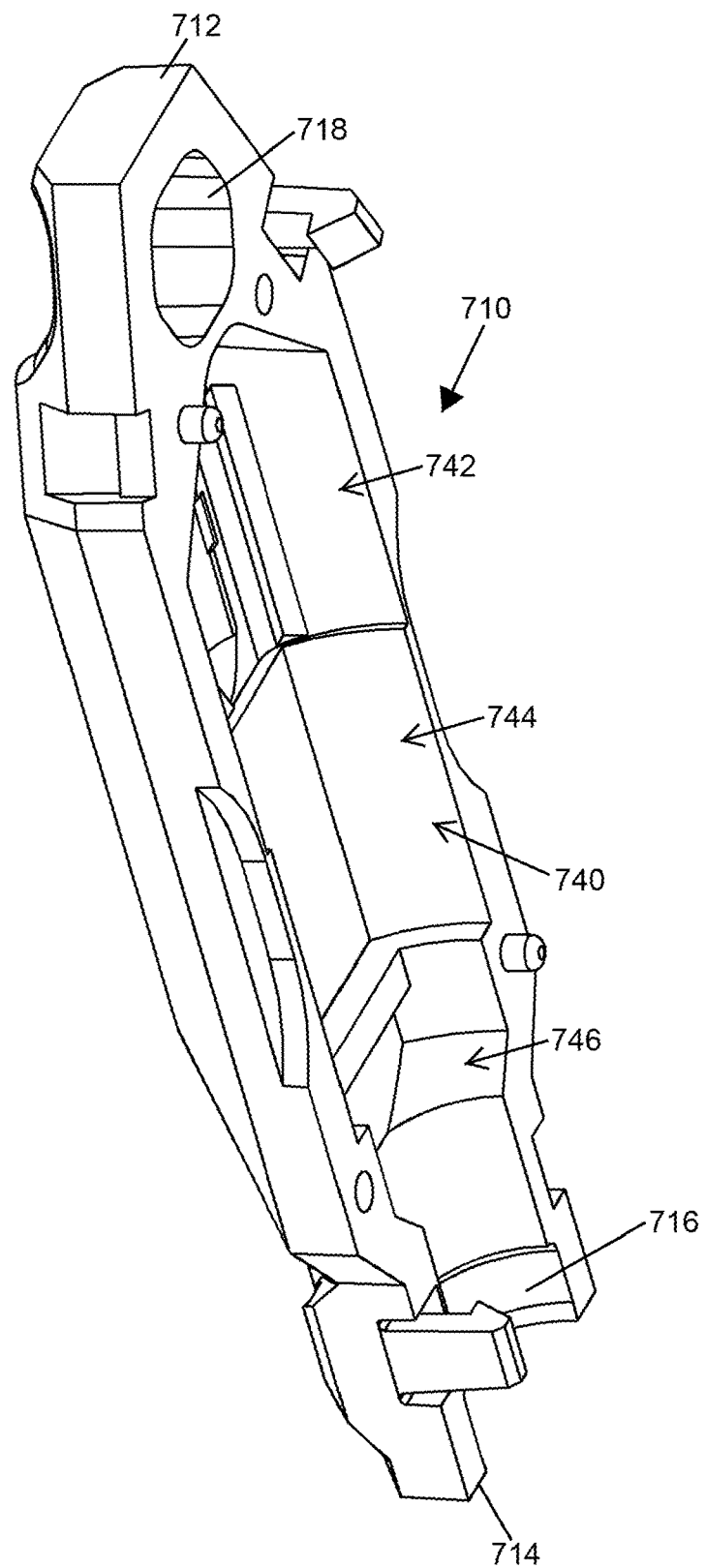
FIG. 28 is still another perspective view of the half of the prior art split pulling eye assembly of FIG. 19.
Figure 29:
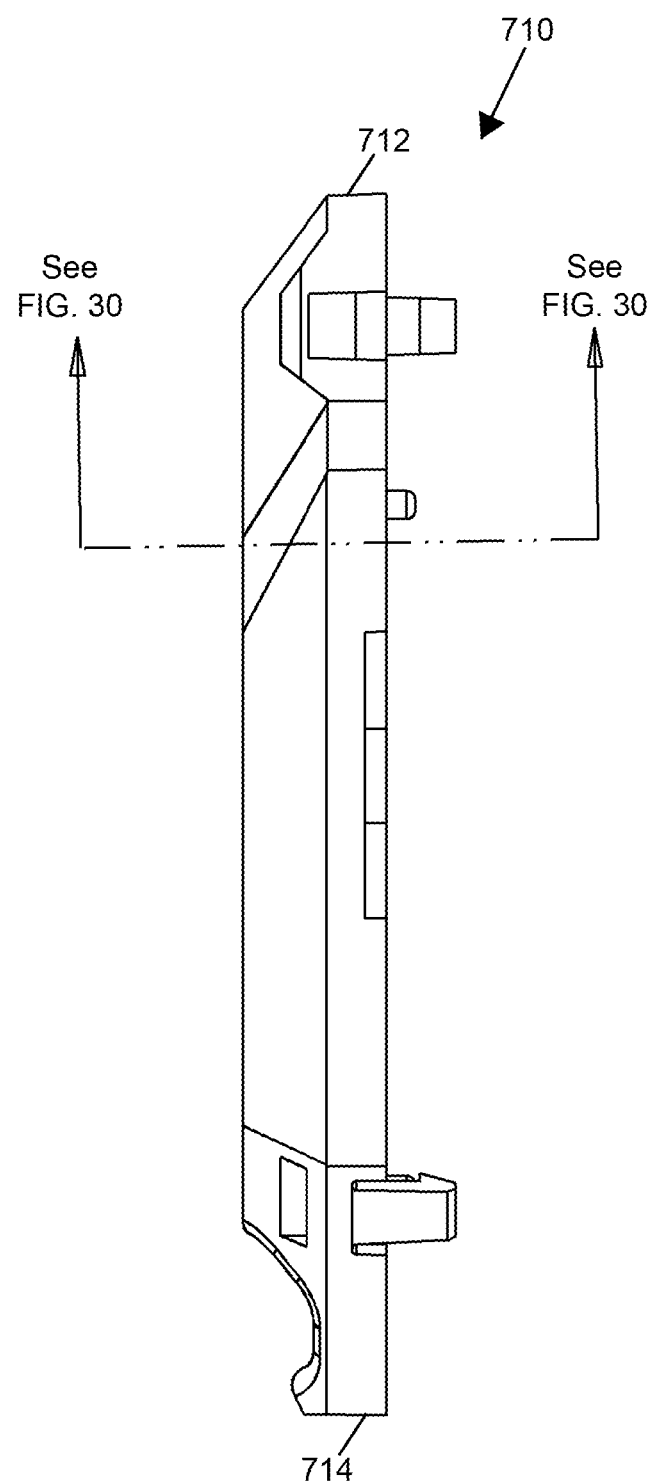
FIG. 29 is a side view of the half of the prior art split pulling eye assembly of FIG. 19.
Figure 30:
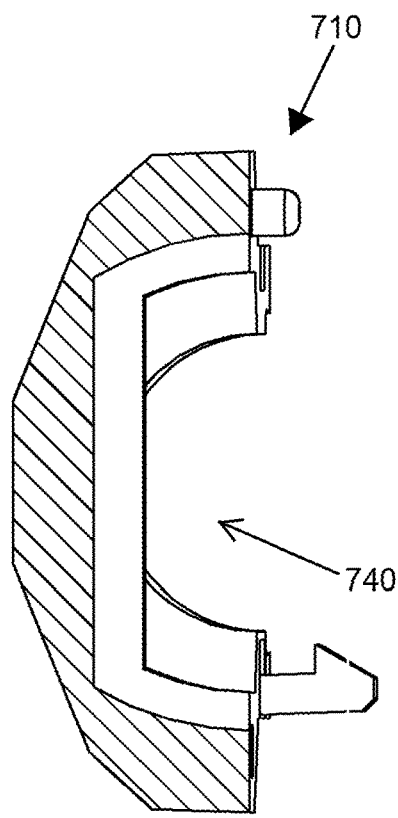
FIG. 30 is a cross-sectional end view of the half of the prior art split pulling eye assembly of FIG. 19, as called out at FIG. 29.

As illustrated at FIG. 22, the pulling eye half 710 includes an interior perimeter 740. As shown at FIG. 45, clearance 750 may exist between certain portions of the interior perimeter 740 and the exterior perimeter 540. The interior perimeter 740 includes a first interior perimeter portion 742 that matches or substantially matches the exterior perimeter 542 of the dust cap 510 (see FIGS. 31 and 32). The interior perimeter 740 further includes a second portion 744 that matches or substantially matches the exterior perimeter 544 of the connector body 320 and the release sleeve 400 that are exposed at the fiber optic connector 300 when assembled to the dust cap 510. The interior perimeter 740 further includes a portion 746 that matches or substantially matches the spring push 430 of the fiber optic connector 300.

Figure 34:
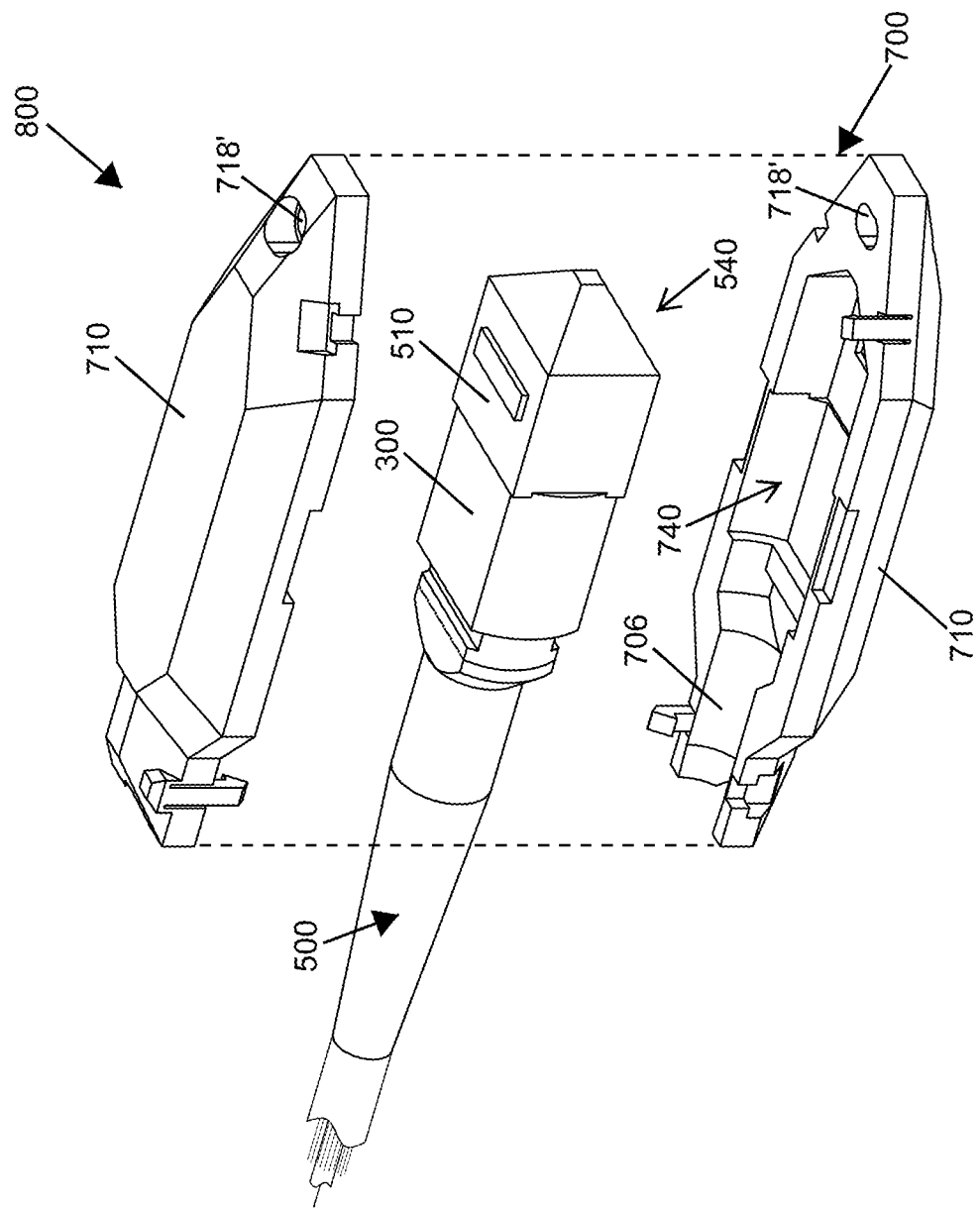
FIG. 34 is the perspective view of FIG. 33, but exploded.
Figure 35:
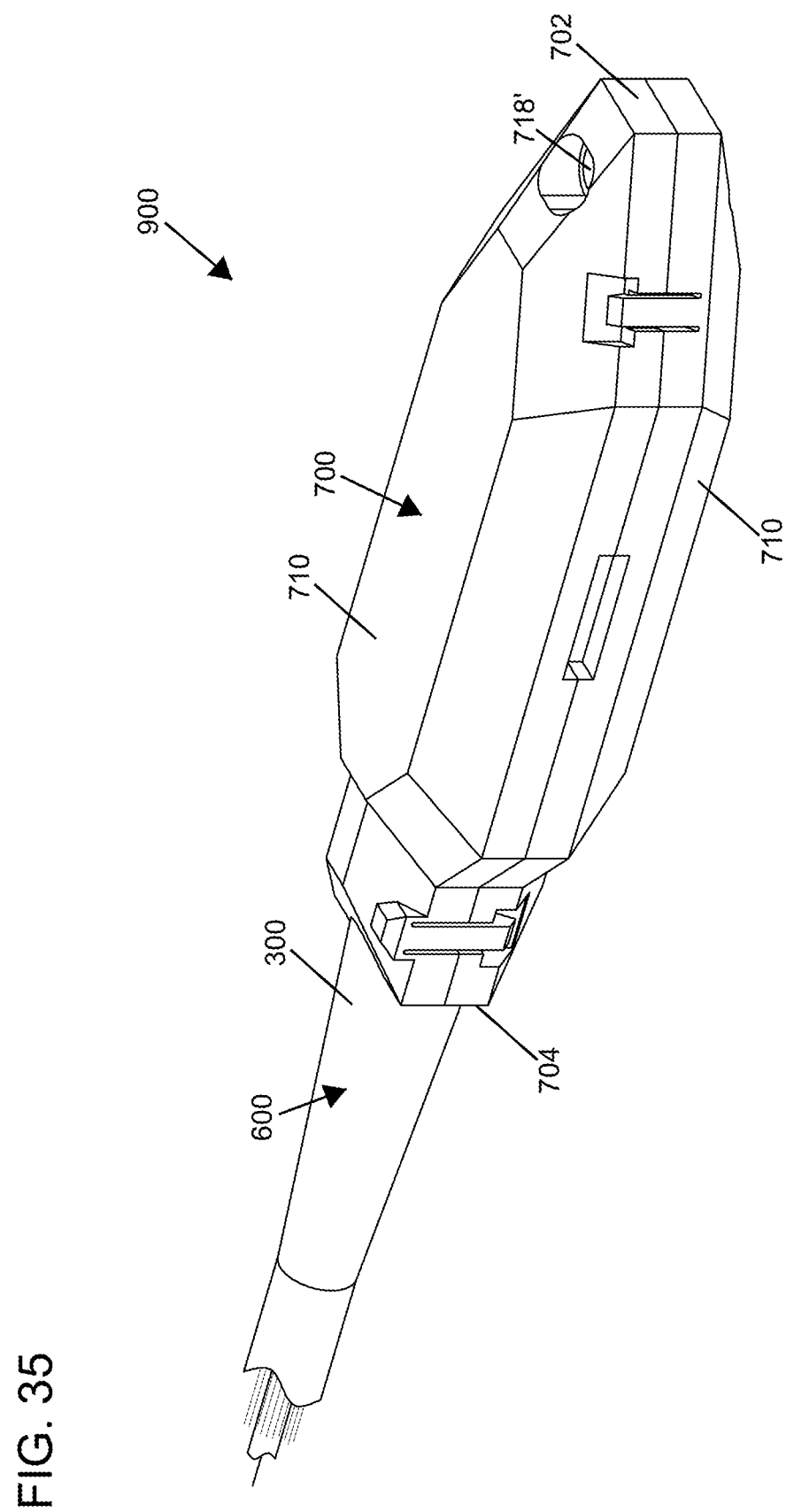
FIG. 35 is a perspective view of the dust cap of FIG. 1 installed on the prior art fiber optic connector and cable assembly of FIG. 9 with the pair of the prior art split pulling eye assembly halves of FIG. 33 installed thereon.
Figure 40:
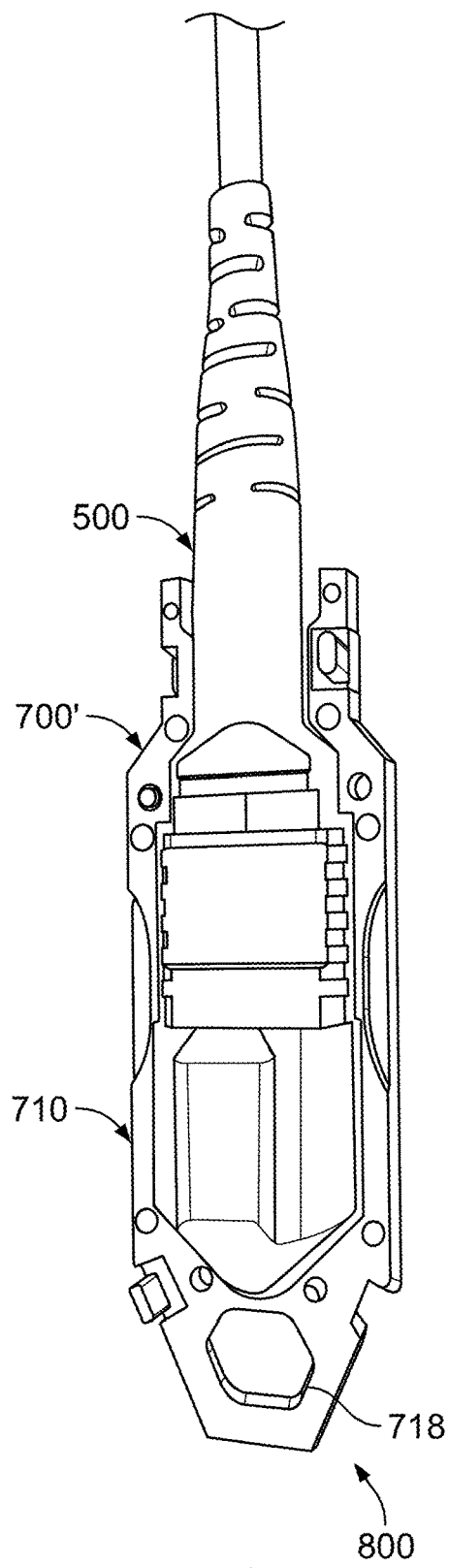
FIG. 40 is a perspective view of the prior art dust cap and the prior art fiber optic connector and cable assembly of FIG. 37 installed in the prior art split pulling eye assembly half of FIG. 19.
Figure 41:
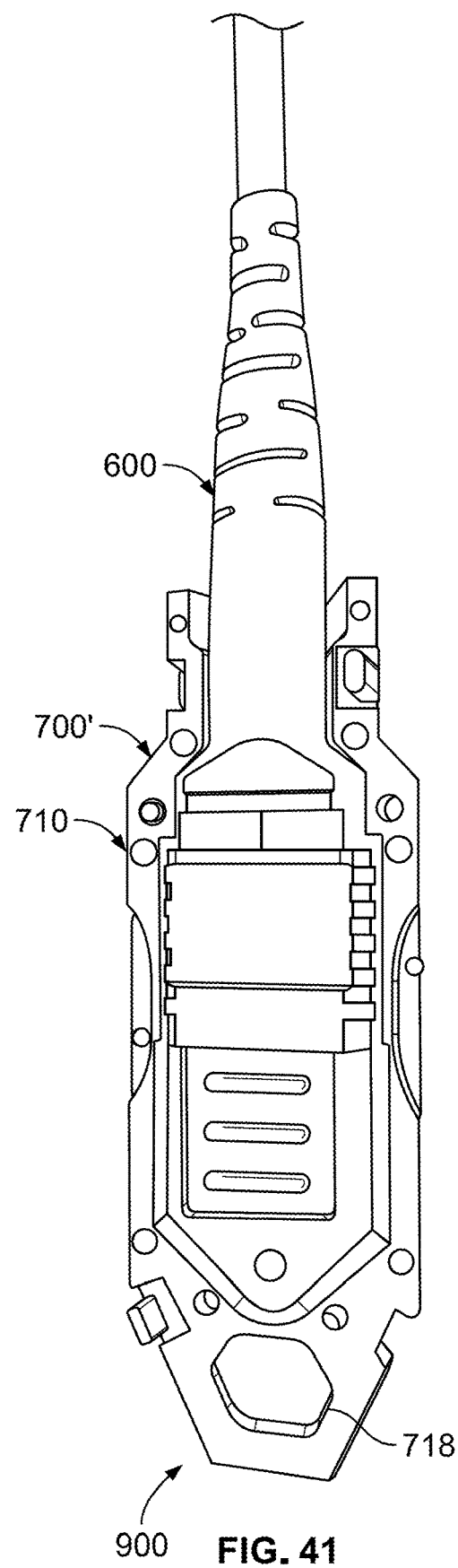
FIG. 41 is a perspective view of the dust cap and the prior art fiber optic connector and cable assembly of FIG. 39 installed in the prior art split pulling eye assembly half of FIG. 19, according to the principles of the present disclosure.

As illustrated at FIG. 40, a first portion of the exterior perimeter 540 of the connector and cable assembly with dust cap 500 fits within the interior perimeter 740 of the pulling eye half 710. As illustrated at FIG. 34, a remaining portion of the exterior perimeter 540 is held by the second pulling eye half 710 within the interior perimeter 740 of the second pulling eye half 710. For the sake of illustration, the pulling assembly 700 is illustrated at FIGS. 40 and 41 as a partial pulling assembly 700' with one of the pulling eye halves 710 removed. The second pulling eye half 710 may be installed over the first pulling eye half 710 before pulling of the fiber optic connector and cable assembly with dust cap 500 commences. As illustrated at FIGS. 33, 34, and 40, the fiber optic connector and cable assembly with dust cap 500 assembled to the pulling assembly 700 forms a prior art cable pulling assembly 800. A pulling member, such as the pulling member 1010, may be looped through the pulling interface 718, 718' and the cable pulling assembly 800 may be routed through various conduits. However, as the cross-dimension of the cable pulling assembly 900 is larger than the encompassing diameter Ø1, the minimum conduit size may be larger for the cable pulling assembly 800 compared with a minimum sized conduit for the fiber optic connector and cable assembly with pulling eye 600, illustrated at FIG. 39.

As mentioned above, the connector and cable assembly with pulling eye 600 fits within the same exterior perimeter 540 as the fiber optic connector and cable assembly with dust cap 500. Therefore, a cable pulling assembly 900 may be similarly assembled by installing the fiber optic connector and cable assembly with pulling eye 600 into the pulling assembly 700.

A first portion of a routed path may be threaded with the cable pulling assembly 900. A larger conduit may be required. However, as the cable pulling assembly 700 may bear directly upon the spring push 430 (i.e., no clearance 750 is between the exterior perimeter 546 of the spring push 430 and the portion 746 of the interior perimeter 740), which is crimped to strength members 466 of the fiber optic cable 260, the load capacity of the cable pulling assembly 900 may be higher than the fiber optic connector and cable assembly with pulling eye 600. Upon the cable pulling assembly 900 reaching a smaller conduit, or for other reasons, the pulling assembly 700 may be removed from the fiber optic connector and cable assembly with pulling eye 600. The connector and cable assembly with pulling eye 600 may be further routed along the desired path with the pulling member 1010.

Various modifications and alterations of this disclosure will become apparent to those skilled in the art without departing from the scope and spirit of this disclosure, and it should be understood that the scope of this disclosure is not to be unduly limited to the illustrated embodiments set forth herein.

What is claimed is:

1. A dust cap for a fiber optic connector and cable assembly, the dust cap comprising:
   a cap body adapted to cover a connectorized end of the fiber optic connector and cable assembly when the connectorized end is inserted through an opening of an interior of the cap body, the cap body further including an opposing pair of resilient walls, the opening being positioned at a sealing face of the cap body; and
   a pair of opposing latches each including a portion connected to one of the resilient walls,
   wherein each portion includes a C-structure defined by exterior surfaces of the cap body, each C-structure including a channel.

2. The dust cap of claim 1, wherein each of the latches includes a latching feature that extends outside of the interior of the cap body.

3. The dust cap of claim 1, wherein each of the latches is continuously joined to and integral with one of the walls along an entire portion of the latch extending from a first end of the latch to the sealing face.

4. The dust cap of claim 3, wherein the cap body includes a tapered nose.

5. The dust cap of claim 1, wherein the sealing face is adapted to seal with the connectorized end of the fiber optic connector and cable assembly when the sealing face of the cap body abuts a sealing face of the connectorized end.

6. The dust cap of claim 2, wherein each of the latching features of the pair of opposing latches includes a latch tab and a latch recess.

7. The dust cap of claim 1, further comprising a pulling interface adapted to attach to a pulling member.

8. The dust cap of claim 7, wherein the pulling interface is included on a tapered nose of the cap body.

9. The dust cap of claim 8, wherein the pulling interface is a pulling eye.

10. The dust cap of claim 1, wherein the resilient walls have a thickness in a range from 0.22 millimeters to 1.22 millimeters.

11. The dust cap of claim 1,
    wherein the cap body includes longitudinal ribs on an interior surface of the cap body;
    wherein the cap body includes pulling grips on an exterior surface of the cap body; and
    wherein each channel includes channel portions and a transition positioned between the channel portions.

12. An assembly, comprising:
    a fiber optic connector and cable subassembly; and
    a dust cap comprising:
      a cap body adapted to cover a connectorized end of the fiber optic connector and cable subassembly when the connectorized end is inserted through an opening of an interior of the cap body, the cap body further including an opposing pair of resilient walls, the opening being positioned at a sealing face of the cap body; and
      a pair of opposing latches each including a portion connected to one of the resilient walls,
      wherein each portion includes a C-structure defined by exterior surfaces of the cap body, each C-structure including a channel.

13. The assembly of claim 12, wherein the sealing face is adapted to seal with the connectorized end of the fiber optic connector and cable assembly when the sealing face of the cap body abuts a sealing face of the connectorized end.

14. A dust cap for a fiber optic connector and cable assembly, the dust cap comprising:
    a cap body extending along an axis defined by the cap body from an open rear-most end of the cap body to a closed front end of the cap body, the cap body extending from a top of the cap body to a bottom of the cap body and from a left side of the cap body to a right side of the cap body, the cap body being adapted to cover a connectorized end of the fiber optic connector and cable assembly when the connectorized end is inserted through an opening of an interior of the cap body, the opening being positioned at the open rear-most end of the cap body at which there is also a rearward facing sealing face of the cap body, the cap body further including an opposing pair of side walls, including a side wall at the left side of the cap body and a side wall at the right side of the cap body, the cap body further including a top wall at the top of the cap body and a bottom wall at the bottom of the cap body; and a latch extending rearwardly from a rear end of a first of the side walls and extending rearwardly beyond the sealing face, the latch including a latch tab positioned rearward of the sealing face, wherein a second of the side walls is continuous at the sealing face with the top wall and with the bottom wall; and wherein a cross-dimension of the dust cap perpendicular to the axis is configured to be a same size as a corresponding cross-dimension of the fiber optic connector and cable assembly perpendicular to the axis.

15. The dust cap of claim 14, wherein an inner surface of the second of the side walls projects into an interior of the cap body.

16. The dust cap of claim 15, wherein an inner surface of the first of the side walls projects into the interior of the cap body and towards the inner surface of the second of the side walls.

17. The dust cap of claim 14, wherein the first of the side walls is continuous at the sealing face with the top wall and with the bottom wall.

18. The dust cap of claim 14, wherein the dust cap is configured to connect to a MPO connector.

19. The dust cap of claim 14,
wherein the dust cap is installed on the fiber optic connector; and
wherein the fiber optic connector is a MPO connector.

20. The dust cap of claim 14, wherein the sealing face is adapted to seal with a connectorized end of the fiber optic connector and cable assembly when the sealing face of the cap body abuts a sealing face of the connectorized end.

* * * * *